US008589402B1

(12) United States Patent (10) Patent No.: US 8,589,402 B1
Iampietro et al. (45) Date of Patent: Nov. 19, 2013

(54) GENERATION OF SMART TAGS TO LOCATE ELEMENTS OF CONTENT

(75) Inventors: Michael Iampietro, San Francisco, CA (US); Abhinav Darbari, Uttar Pradesh (IN); Ramesh P B, Uttar Pradesh (IN); Ram Narain Yadav, Uttar Pradesh (IN); Arvinder Singh, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 846 days.

(21) Appl. No.: 12/196,127

(22) Filed: Aug. 21, 2008

(51) Int. Cl.
G06F 7/00 (2006.01)
G06F 17/30 (2006.01)

(52) U.S. Cl.
USPC ........... 707/741; 707/752; 707/758; 707/914; 707/915

(58) Field of Classification Search
USPC .................. 707/736, 741, 752, 758, 914, 915
See application file for complete search history.

(56) References Cited

U.S. PATENT DOCUMENTS

| | | | |
|---|---|---|---|
| 5,754,939 A | 5/1998 | Herz et al. | |
| 5,819,258 A | 10/1998 | Vaithyanathan et al. | |
| 6,285,995 B1 | 9/2001 | Abdel-Mottaleb et al. | |
| 6,408,301 B1 | 6/2002 | Patton et al. | |
| 6,629,104 B1 | 9/2003 | Parulski et al. | |
| 7,010,144 B1 * | 3/2006 | Davis et al. | 382/100 |
| 7,162,488 B2 * | 1/2007 | DeVorchik et al. | 707/102 |
| 7,706,004 B2 | 4/2010 | Prakash | |
| 7,719,574 B2 | 5/2010 | Nakami et al. | |
| 2004/0240562 A1 * | 12/2004 | Bargeron et al. | 375/240.29 |
| 2005/0044112 A1 | 2/2005 | Yamamoto et al. | |
| 2006/0253491 A1 * | 11/2006 | Gokturk et al. | 707/104.1 |
| 2007/0067277 A1 * | 3/2007 | Ahn et al. | 707/4 |
| 2007/0282908 A1 | 12/2007 | Van der Meulen et al. | |
| 2008/0198159 A1 * | 8/2008 | Liu et al. | 345/420 |
| 2008/0301583 A1 | 12/2008 | Akagi | |
| 2009/0156947 A1 * | 6/2009 | Seward et al. | 600/508 |
| 2009/0216806 A1 * | 8/2009 | Feuerstein et al. | 707/104.1 |
| 2010/0287161 A1 * | 11/2010 | Naqvi | 707/740 |

OTHER PUBLICATIONS

U.S. Appl. No. 12/196,101, filed Aug. 21, 2008.
Office Action dated Jun. 29, 2011 in U.S. Appl. No. 12/196,101.
Office Action dated Nov. 1, 2011 in U.S. Appl. No. 12/196,101.
Notice of Allowance dated Feb. 15, 2012 in U.S. Appl. No. 12/196,101.
Notice of Allowance in related U.S. Appl. No. 13/480,402, dated Apr. 4, 2013, 10 pages.

* cited by examiner

*Primary Examiner* — Marc Somers
(74) *Attorney, Agent, or Firm* — Kilpatrick Townsend & Stockton LLP

(57) ABSTRACT

Generating smart tags that allow a user to locate any portion of image content without viewing the image content is disclosed. Image-based processing is performed on image content to find an event of interest that is an occurrence captured by the image content. Thus, metadata is derived from analyzing the image content. The metadata is then analyzed. Different types of characteristics associated with portions of the image content as indicated by the metadata are detected. Responsive to this, tags are created, and different types of tags are applied to the portions of image content to categorize the portions into classes. Thus, a tag is associated with each portion of the image content including the event of interest. The tag describes a characteristic of that portion of the image content. Display of the different types of tags is initiated for selective viewing of the portions of the image content.

28 Claims, 12 Drawing Sheets

701 PERFORM IMAGE-BASED PROCESSING ON IMAGE CONTENT TO FIND AN EVENT OF INTEREST, AN EVENT OF INTEREST COMPRISING AN OCCURRENCE CAPTURED BY THE IMAGE CONTENT

↓

702 CREATE A TAG, THE TAG ASSOCIATED WITH EACH PORTION OF THE IMAGE-RELATED CONTENT INCLUDING THE EVENT OF INTEREST AND DESCRIBING A CHARACTERISTIC OF THAT PORTION OF THE IMAGE CONTENT

↓

703 DISPLAY THE IMAGE CONTENT AND THE TAGS ASSOCIATED WITH THE IMAGE CONTENT

↓

704 RECEIVE NEW IMAGE CONTENT, THE NEW IMAGE CONTENT DISTINCT FROM ORIGINAL IMAGE CONTENT

↓

705 AUTOMATICALLY APPLY THE TAGS CREATED FOR THE ORIGINAL IMAGE CONTENT TO THE NEW IMAGE CONTENT TO LOCATE PORTIONS OF THE NEW IMAGE CONTENT INCLUDING THE EVENTS OF INTEREST DESCRIBED BY THE TAGS

↓

706 ASSOCIATE THE TAGS WITH ANY LOCATED PORTIONS OF THE NEW IMAGE CONTENT

↓

707 PRESENT THE ORIGINAL IMAGE CONTENT, THE NEW IMAGE CONTENT, AND THE TAGS ASSOCIATED WITH EACH

↓

708 RECEIVE A SELECTION OF A TAG, THE TAG ASSOCIATED WITH A PORTION OF THE ORIGINAL IMAGE CONTENT AND WITH A PORTION OF THE NEW IMAGE CONTENT

↓

709 ADVANCE THE PRESENTATION OF THE ORIGINAL IMAGE CONTENT TO A PORTION OF THE ORIGINAL IMAGE CONTENT ASSOCIATED WITH THE SELECTED TAG, AND SIMULTANEOUSLY ADVANCE THE PRESENTATION OF THE NEW IMAGE CONTENT TO A PORTION OF THE NEW IMAGE CONTENT ASSOCIATED WITH THE SELECTED TAG

FIG. 7

GENERATION OF SMART TAGS TO LOCATE ELEMENTS OF CONTENT

CROSS REFERENCE TO RELATED APPLICATIONS

This Patent Application is related to co-pending U.S. patent application Ser. No. 12/196,101 entitled "MANAGEMENT OF SMART TAGS VIA HIERARCHY" and filed on Aug. 21, 2008, the contents and teachings of which are hereby incorporated by reference in their entirety.

BACKGROUND

Users take more photographs, audio, and video with digital cameras and camcorders (as well as cell phones) now than ever before. In the past, the primary disadvantage to acquiring large amounts of digital content was the unavailability of inexpensive storage devices, particularly if a user acquired the content in a high-resolution format. Advances in storage technology have resulted in greater amounts of storage being sold at a lower cost, such that it is now possible to purchase many gigabits of storage for a few hundred dollars, sometimes less. Now, the opposite situation has emerged, where most users of digital devices have so much acquired content, it is hard for them to easily organize and make sense of it all.

A number of software applications are available that allow a user to preview and navigate their digital content wherever that content may be stored, and then edit it, share it, and produce the content in a variety of ways. Even operating systems, such as the Microsoft® Windows® family of operating systems, include an automatic preview of a folder containing digital images by providing thumbnails of some of the images contained within a folder. Other applications may create previews in their own particular ways, such as showing a number of condensed-sized thumbnails of digital images, a short clip of a longer video file, or a short clip of a longer audio file.

Operating systems, such as Microsoft® Vista®, as well as digital content acquisition applications that come bundled with a digital camera/camcorder, such as Olympus® X®, or is freely available, such as Picasa® by Google®, allow a user to identify elements of digital content when a user downloads that content from a source (i.e., a digital camera, cameraphone, digital camcorder or other video recorder, memory device located in a digital device, and so on) to a computer. This is a manual process that involves the user typing, or otherwise providing, the descriptive information to the application. These applications thus allow a user to preview and search through digital content. Some information about the digital content may be produced by the capturing device itself, and is then acquired by the application. For example, a digital camera may encode, within a digital image captured by the camera, the type of camera used to capture the image, as well as the time and date on which the image was captured, the size of the image in bytes, the settings used by the camera when capturing the image, and so on.

SUMMARY

Conventional mechanisms for acquiring and searching through digital content, such as those explained above, suffer from a variety of deficiencies. One such deficiency is that even with thumbnail and/or clip-type previews, for a user to find a certain set of images from among thousands of images, or a certain sequence of video within hundreds of hours of video spread across multiple files, may take hours. Each time the user is looking for something in particular, the search process is repeated, and more time is consumed. However, in general, users of home video, audio, and image editing applications do not want to spend hours at a time finding particular desired content, over and over again. Further, even if the user has entered in some descriptive data regarding their digital content, the amount of time necessary to log every possible characteristic of every image or frame of that content is immense, and the process is again a manual one that must be repeated each and every time the user acquires new digital content.

Embodiments described herein significantly overcome such deficiencies and provide mechanisms and techniques for a so-called smart detect algorithm that analyzes content and automatically creates one or more tags based on detection of different occurrences in the content. The smart detect algorithm analyzes image-based content, such as video or static images, for different types of occurrences. For example, in one embodiment, the algorithm analyzes the video to find panning, zooming, camera tilting, static scenes, objects, faces, location of faces, sizes of faces, focus, shakiness of camera, brightness, contrast, and so on. When the smart detect algorithm detects the occurrence of an event, such as that a blurriness of the video is above a threshold value or other circumstance, the smart detect algorithm creates and associates a respective tag for the given circumstance. The tag is then displayed. Such a tag, which may also be referred to herein as a smart tag, allows a user to quickly and easily find a particular event of interest within digital content, without viewing the content in advance. In some embodiments, based upon a selection of at least one tag, the related content may also be displayed.

The process of producing smart tags may be repeated for each of multiple different types of parameters, so that analyzed content has a number of different tags, or types of tags, associated with it. The process may also be applied to all forms of digital content, wherever they are stored. Thus, a large library of digital content, for example a collection of a family's digital photos and videos, may be analyzed and tagged as described herein so that a user is able to find, for example, scenes where a child was opening presents on their last 3 birthdays, by simply selecting the displayed smart tags corresponding to those events.

More particularly, in one embodiment, there is provided a computer-implemented method. The computer-implemented method includes analyzing metadata associated with image content, the metadata derived from analyzing the image content. That is, image content is analyzed according to image-based analysis techniques, and the result of the analysis is generation of metadata associated with the image content. The computer-implemented method also includes, responsive to detecting different types of characteristics associated with portions of the image content as indicated by the metadata, applying different types of tags to the portions of image content to categorize the portions of the image content into classes. A display manager may be configured to initiate display of the different types of tags for selective viewing of the portions of the image content. Based on such an embodiment, a viewer may comprehend image content based on viewing of the different types of tags associated with the image content.

In a related embodiment, the computer-implemented method may further include receiving search parameters specifying retrieval of portions of image content tagged with both a first tag type and a second tag type. In response to receiving the input, a display manager initiates display of corresponding portions of the image content having been tagged with both the first tag type and the second tag type.

In another related embodiment, the computer-implemented method may further include maintaining the different types of tags associated with the image content, each of the different types of tags specifying at least one respective portion of the image content. A display manager may be configured to initiate display of the different types of tags in a listing. In response to receiving selection of a given tag type from the listing, the display manager initiatesretrieval and display of respective portions of the image content tagged with the given tag type.

In another embodiment, there is provided a method, system, etc. The method includes performing image-based processing on image content to find an event of interest. An event of interest comprises an occurrence captured by the image content. In other words, an event of interest is something that is discernable by viewing the image content. The method also includes creating a tag. The tag is associated with each portion of the image content that includes the event of interest. The tag describes a characteristic of that portion of the image content. A tag may be, for example, a tag type indicating that a respective portion of the image content includes a group of four people.

The method may include displaying the image content and/or the tags associated with the image content. The tag itself and association of the tag of with each portion of the image content allows a user to quickly and easily find each occurrence of the event of interest in the image content by simply selecting the displayed tag. Thus, if a user desired to find all occurrences in a video file where the user's face appeared, the user would select the tag corresponding to the presence of the user's face.

As mentioned above, multiple tags may be created for image content. Thus, the same portion of image content may have one or more tags associated with it. A user is able to quickly and easily find, in the image content, each occurrence of events of increasing complexity by simply selecting all of the displayed tags that correspond to the event. For example, if the user desired to find all occurrences in the same video file where the user's face and the user's brother's face appeared outside in a pool, the user would select the tags corresponding to the presence of the user's face, the user's brother's face, the presence of outside locations, and the presence of a pool.

In a related embodiment, the method may include receiving event information defining of the event of interest. In such an instance, performing may include performing image-based analysis on the image content to find, in the image content, those portions of the image content that include the event of interest as defined by the event information. For example, event information may be a description of people at a birthday party, in which case one or more image-based analyses would be performed on the image-based content to find where any images show the people as described at a birthday party. In the related embodiment, creating may also include generating a tag associated with each portion of the image content including the event of interest. The tag includes the event information as one or more values, and each value details a characteristic of the associated image content. Thus, each time in the image content people were at a birthday party, a tag would be associated with that portion of the image content, and the tag may include a value indicating, for example, the number of people in that portion of the image content.

In another related embodiment, an analyzer may be configured to determine one or more different types of metadata associated with the image content, the metadata including a value describing a parameter of a portion of the image content, and evaluating the metadata to find instances in the content where the value describing the parameter exceeds a threshold value for that parameter. The metadata may be generated based on analyzing attributes of pixels in respective image content. Generation of metadata may include determining the blurriness level (or lack of focus) of images in the image content, where the blurriness level is represented by a value. The value of the level of blurriness may be evaluated or compared to a threshold value of blurriness to find instances where images in the image content are in focus.

In a further related embodiment, steps of determining one or more attributes of the image content may include discovering a value describing an image-related parameter of a portion of the image content, wherein the value is stored as metadata associated with the portion of the image content. In the further related embodiment, evaluating may then include searching the metadata to find a section of images in the image content where the value describing the image-related parameter exceeds a threshold value for one or more images in a section of the image content. Creating may then include generating a tag, the tag associated with the found section of images in the image content and describing a characteristic of the found section of images in the image content. Thus, the value indicating an attribute such as, for example, the blurriness level, lack of focus, color saturation, etc. in one or more images of the image content may be discovered, and that value may be stored as metadata. In a specific example, a blurriness value over a set amount, say 0.2, may indicate that the image is out of focus. All of the blurriness values are then searched, and for each single image, or each section of images, over 0.2, a tag is generated to indicate that that image, or section of images, is blurry or otherwise out of focus.

In yet another related embodiment, the system as described herein may be configured to perform image-based processing on image content to find a plurality of events of interest, each event of interest comprising an occurrence captured by the image content. The system may create a tag for each event in the plurality of events of interest, each tag associated with each portion of the image content including the related event of interest in the plurality of events of interest, each tag describing a characteristic of that portion of the image content. Thus, content may be analyzed to find all instances where, for example, a person with brown hair was outside at night with a person with blue eyes, and each such occurrence of all of those events in the content will have associated tags including a tag for events occurring outside, a tag for events occurring at night time, a tag for one person having brown hair, and a tag for one person having blue eyes. In some instances, these distinct tags may be combined together to form a single tag including all of the events of interest.

In yet still another related embodiment, displaying of information for viewing may include presenting the image content and the tags associated with the image content in a graphical user interface, and the method may further include receiving a selection of a displayed tag, and advancing the presentation of the image content to a portion of the image content associated with the selected tag. For example, tags for a person with brown hair, a person with blue eyes, and so on, are shown on the graphical user interface, along with the related content (say a video of a party). The video plays within the graphical user interface. When a user selects the "person with brown hair" tag, the playback of the video advances to the next image in the video where the tag "person with brown hair" is associated, and thus the next image in the video where a person with brown hair is found. Thus, a respective viewer may skip images to view image content of a particular type using the tags as described herein.

In a further related embodiment, advancing may include advancing the presentation of the image content to a first portion of the image content associated with the selected tag. Then, upon completion of presenting the first portion of the image content, advancing may also include jumping the presentation of the image content to a second portion of the image content associated with the selected tag. The step of jumping may then be repeated for each successive portion of the image content associated with the selected tag. Thus, after the playback of the video jumps to the first occurrence in the video of a person with brown hair, when that person is no longer in the video, playback of the video will jump to the next instance where a person with brown hair appears, which corresponds to the next image in the video that is tagged with the "person with brown hair" tag. Playback of the video will continue to jump to each image, or sequence of images, in the video where a person with brown hair appears.

In other words, in another further related embodiment, the system as described herein may perform image-based processing on video to find an event of interest, an event of interest comprising an occurrence captured by the video. The system creates a tag, the tag associated with each frame of the video including the event of interest and describing a characteristic of that frame of the video. A display manager may initiate presenting may then include playing the video in the graphical user interface, and showing a sequence of the frames of the video, and their associated tags, in the graphical user interface. Advancing of the image content may include advancing the play of the video to a frame of the video associated with the selected tag.

In still yet another related embodiment, the method may include receiving new image content, the new image content distinct from original image content. The system may be configured to automatically apply the tags created for the original image content to the new image content to locate portions of the new image content including the events of interest described by the tags. The method may also include associating the tags with any located portions of the new image content. Thus, after a first video has been analyzed and tagged, a second video may be received, analyzed, and tagged with similar types of tags. The tags created from the analysis of the first video are automatically used as tags for the second video, and are associated with the appropriate images and/or frames in the video.

In a further related embodiment, the method may include presenting the original image content, the new image content, and the tags associated with each, and receiving a selection of a tag, the tag associated with a portion of the original image content and with a portion of the new image content. The method may also include advancing the presentation of the original image content to a portion of the original image content associated with the selected tag, and simultaneously advancing the presentation of the new image content to a portion of the new image content associated with the selected tag. Here, when the user selects, for example, the tag for "a person with brown hair", the playback of the first video is advanced to the first occurrence of a person with brown hair in the first video, and simultaneously, the playback of the second video is advanced to the first occurrence of a person with brown hair in the second video. This allows a user to quickly and easily find related events in separate units of image content.

In another embodiment, there is provided a computer program product including a computer-storage medium having instructions stored thereon for processing data information. The instructions, when carried out by a processing device, enable the processing device to perform operations of performing image-based processing on image content to find an event of interest, an event of interest comprising an occurrence captured by the image content; creating a tag, the tag associated with each portion of the image content including the event of interest and describing a characteristic of that portion of the image content; and displaying the image content and the tags associated with the image content.

In another embodiment, there is provided a computer system. The computer system includes a processor, a memory unit that stores instructions associated with an application executed by the processor, a display, and an interconnect coupling the processor, the memory unit, and the display, enabling the computer system to execute the application and perform operations of: performing image-based processing on image content to find an event of interest, an event of interest comprising an occurrence captured by the image content; creating a tag, the tag associated with each portion of the image content including the event of interest and describing a characteristic of that portion of the image content; and displaying the image content and the tags associated with the image content.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing client management of download sequence of orchestrated content as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations may be installed onto a computerized device to cause one or more processors in the computerized device to perform the techniques explained herein as embodiments of the invention. Software processes that operate in a collection of computerized devices, such as in a group of data communications devices or other entities may also provide the system of the invention. The system of the invention may be distributed between many software processes on several data communications devices, or all processes could run on a small set of dedicated computers, or on one computer alone.

It is to be understood that embodiments of the invention may be embodied strictly as a software program, as software and hardware, or as hardware and/or circuitry alone, such as within a data communications device. The features disclosed and explained herein may be employed in data communications devices and other computerized devices and software systems for such devices such as those manufactured by Adobe Systems Incorporated, of San Jose, Calif.

Note that each of the different features, techniques, configurations, etc. discussed in this disclosure may be executed independently or in combination. Accordingly, the present invention may be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 7 illustrates a flowchart of a procedure performed by the system of FIG. 4 when processing two or more distinct entities of image content using the smart tags created for an original entity of image content.

DETAILED DESCRIPTION

Generally, disclosed embodiments provide methods, computer readable media, apparatus, etc. for performing image-based processing on image content to find one or more events of interest, by analyzing metadata derived from analysis performed on the image content. Tags, which in certain instances may be considered smart tags, are created and applied to image content based on the results of the processing, and more specifically, based upon detecting different characteristics associated with portions of the image content as identified by the metadata. In an example embodiment, a tag may describe an event (or events) of interest, and may be associated with each occurrence of that event (or events) in the image content. The tags may be displayed to a user. A user is thus able to find an event or events within the image content by simply selecting the relevant tag or tags, which causes the corresponding portion of the image content to be shown to the user.

Figure 1:
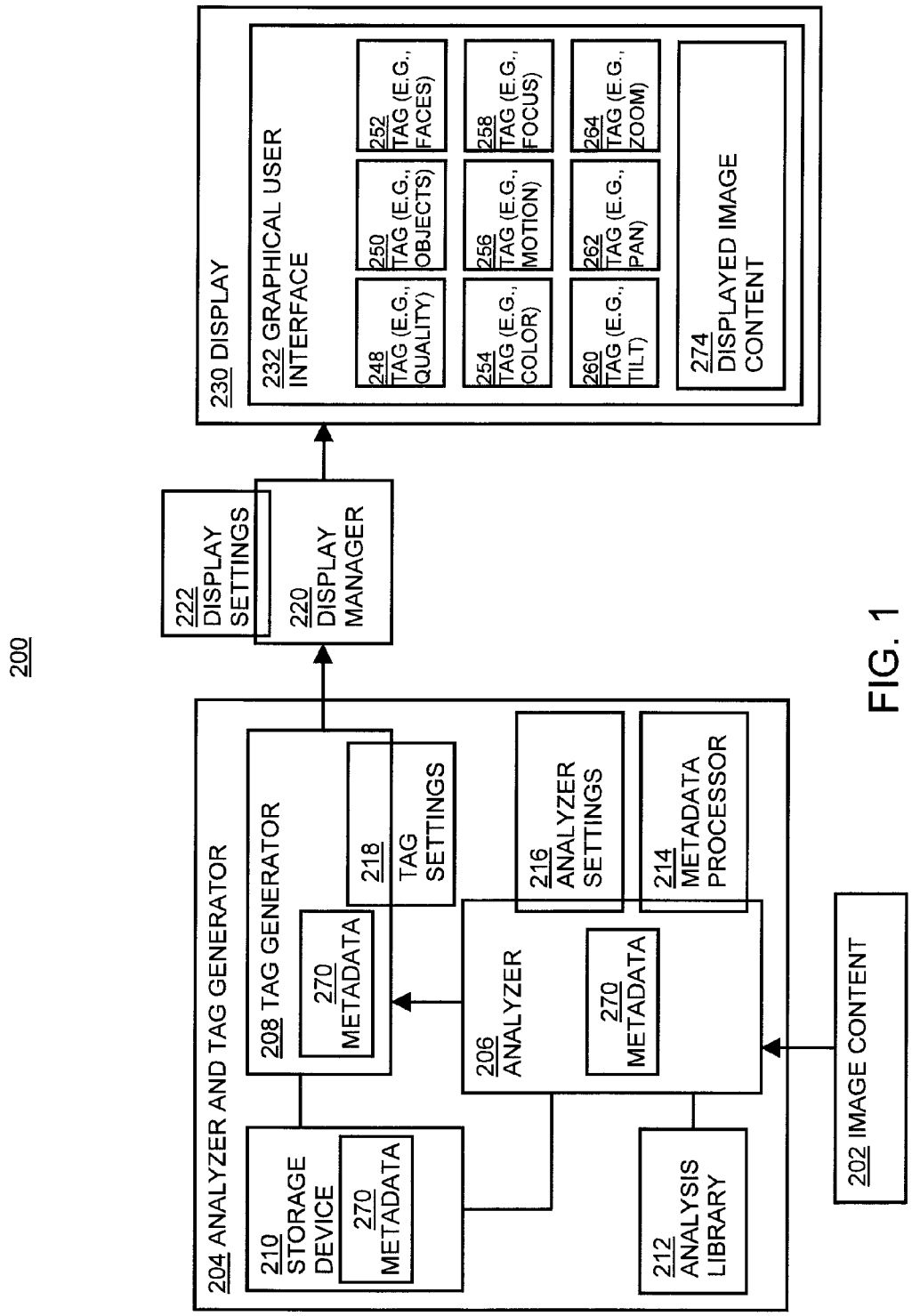
FIG. 1 shows an example of a system for generating smart tags for image content according to embodiments described herein.

More particularly, FIG. 1 is a block diagram illustrating a system 200 that receives and process image content 202 according to embodiments herein. The image content 202 may be any type of data capable of being displayed on display 230, and may include audio data, video data, textual data, graphical data, image data, multimedia data, etc.

In the example embodiment as shown, the image content 202 is sent to an analyzer and tag generator 204, which includes both an analyzer 206 and a tag generator 208.

The analyzer 206 receives the image content 202 and performs image-based processing on it according to analyzer settings 216. The result of the image-based processing is generation of metadata 270, which is maintained in a storage device 210 and is passed to the tag generator 208. For example, when the image content 202 includes image data, the analyzer settings 216 may instruct the analyzer 206 to find a parameter or attribute of the image content such as every occurrence in the image content 202 of a particular face. The analyzer settings 216, such as parameters indicating presence of the particular face, may be automatically determined or may be provided through user input.

In some situations, the analyzer 206 accesses an analysis library 212 to retrieve one or more particular analysis procedures for use on the image content 202.

The analyzer 206 may utilize a metadata processor 214 to derive the metadata 270. For example, the metadata processor 214 may, when the image content 202 includes image data, perform a particular type of image processing on the image content 202 to determine image-related parameters, such as the amount of blurriness in the image content 202.

In some embodiments, the metadata is generated based on an analysis of a variation amongst pixels in the image content. In some embodiments, the metadata is generated based on an analysis of a coloration of pixels in the image content. Note that this has been by way of a non-limiting example only and that and types of attributes of the image content may be used to generate tags as described herein.

The results of the analysis performed by the analyzer 206 (i.e., the metadata 270) and the image content 202 are then passed to a tag generator 208. The tag generator 208 creates tags (such as tags 248, 250, 252, 254, 256, 258, 260, 262, and 264) according to the metadata 270, the image content 202, and tag settings 218, as described herein, and then associates those tags with the image content 202. Thus, the tag generator 208 performs analysis on the metadata 270 as derived by the analyzer 206 to identify different portions of image content and apply suitable tags. Of course, the tag generator 208 may create any number of tags, and may create different types of tags. In some embodiments, the tag settings 218 may be automatically determined, pre-set, or provided by user input. The tag generator 208 is able to store any created tags, as well as any data associated with those tags, in the storage device 210.

In some embodiments, the tag generator 208 receives input (through, for example, the tag settings 218) that specifies an event and a corresponding event type tag to be applied to portions of the image content 202 in which the event occurs.

An event may be an occurrence captured by a portion of the image content 202 or corresponding sound associated with the image content. For example, an event may be a holiday party, or the appearance of a particular person and/or object in the image content 202. The tag generator 208 then analyzes the metadata 270 associated with the image content 202 to identify occurrences of the event with respect to the image content 202. That is, the tag generator 208 uses the metadata 270 to find at what points in the image content 202 (i.e., images or frames) the specified event is present.

If the specified event is the appearance of a particular object, such as a birthday cake, the metadata 270 may identify at what locations a birthday cake (or other specified object) appears in the image content 202. For each of the occurrences, the tag generator 208 tags respective locations of the image content 202 with the corresponding event type tag. For example, when the metadata 270 indicates that a frame or image of the image content 202 includes a birthday cake, the tag generator 208 will tag that frame or image with a birthday cake tag. The generated tag may include a pointer to a specific location in the image content 202 where the object associated with a respective tag may be found.

The tag generator 208, in some embodiments, may be configured to detect different types of characteristics associated with portions of the image content 202. For example, the tag generator 208 analyzes a first tag type and corresponding tag information to identify parameters in which to apply the first tag type to respective portions of the image content 202. In other words, the tag information may specify the different types of rules for creating the tags.

The corresponding tags may be configured to include information such as metadata used in the creation of the tag as well as the reason why the tag was applied to a corresponding portion of image content. In other words, a respective tag may include information such as a reference to a portion of the image content, a reference to a rule indicating why a particular tag was created, etc. Additionally, each tag may have extra metadata associated with a tagged portion of the image content 202 that was not used to create the tag.

In other words, the tag may be a focus type tag indicating that the tagged portion of image content is in focus. The tag may itself include or include a pointer to additional metadata associated with the image content such as color saturation, sound, etc. that is not associated with creation of the tag.

Thus, in one embodiment, based on analyzing metadata 270 associated with a given portion of the image content 202, the tag generator 208 may detect that the given portion of the image content 202 falls within a range of parameters as specified by the corresponding tag information. Thus, the tag information for an in-focus tag may include, for example, a rule indicating that the tag should be applied to any content when the focus level of the content is over a value of 0.9. The tag generator 208 detects that, for a given portion of the image content 202, the metadata describing the focus level of the given portion is 0.95, and thus, the tag generator 208 applies the in-focus tag to the given portion. In other words, the tag generator 208, when applying the different types of tags to the portions of image content 202, applies a tag of the first tag type to the given portion of the image content 202.

When the tag generator 208 has applied the tags to the image content 202, using any of the techniques described above, the tag generator 208 then passes the tags and the image content 202 to a display manager 220. The display manager 220 passes the tags to a display 230 for presentation according to display settings 222. For example, the display 230 may show the tags 248, 250, 252, 254, 256, 258, 260, 262, and 264 on a graphical user interface 232 (where the tag 248 represents a quality tag, the tag 250 represents an objects tag, the tag 252 represents a faces tag, and so on as shown in FIG. 1).

Of course, the layout and presentation of the tags 248, 250, 252, 254, 256, 258, 260, 262, and 264 within the graphical user interface 232 is not limited to any particular layout and/or presentation style and may be achieved in any way known in the art. For example, the tags 248, 250, 252, 254, 256, 258, 260, 262, and 264 may be organized in a hierarchy, as described in detail in co-pending application U.S. Ser. No. 12/196,101, entitled "MANAGEMENT OF SMART TAGS VIA HIERARCHY" and filed herewith. When a user selects at least one of the tags 248, 250, 252, 254, 256, 258, 260, 262, and 264, the display manager 220 will also initiate display of displayed image content 274. The displayed image content 274 includes any portions of image content 202 that are associated with the selected tags.

Figure 9:
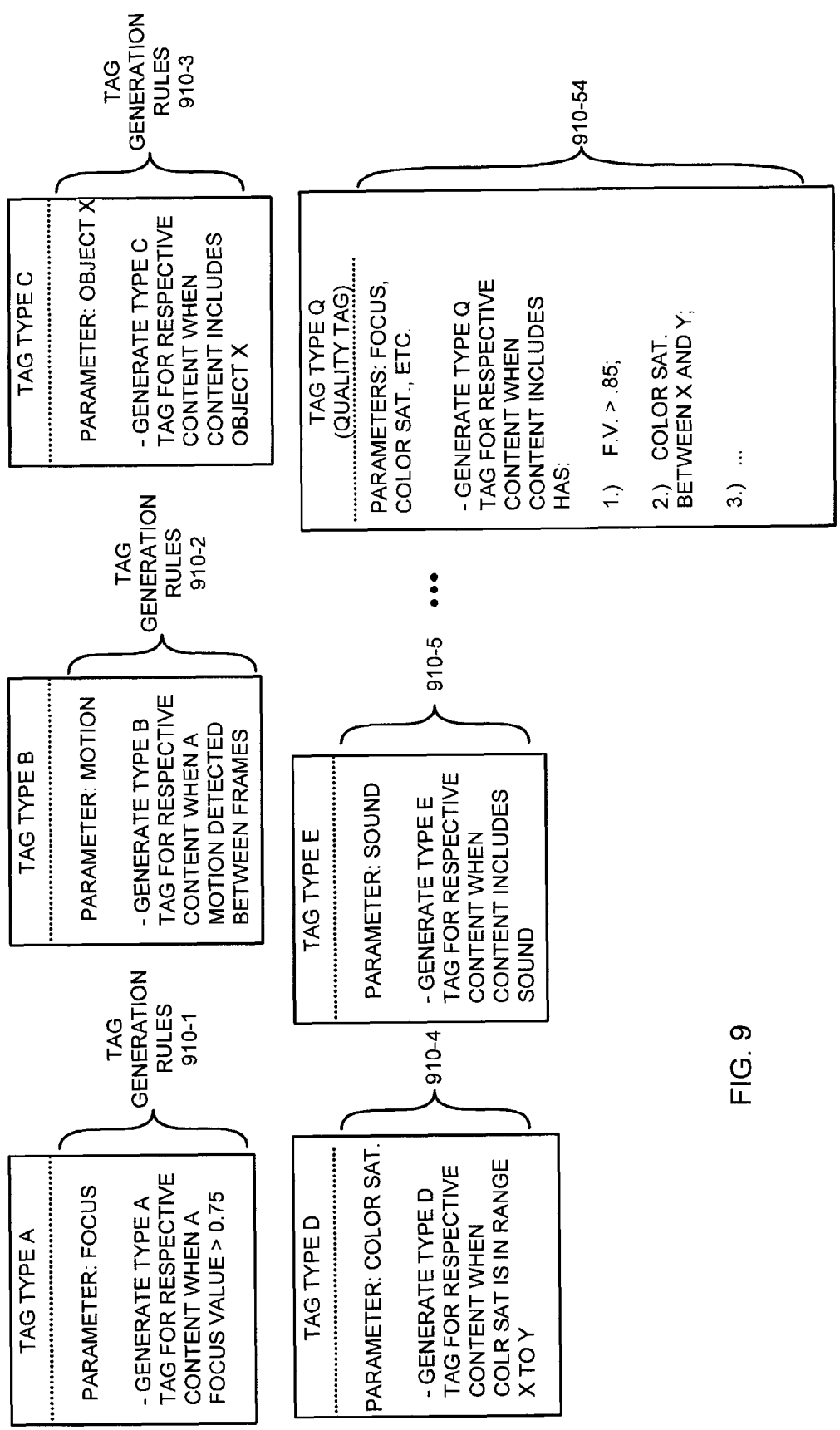
FIG. 9 illustrates examples of different types of tags, including a so-called super tag formed from a variety of tags according to embodiments herein.

Examples of different types of tags are shown in FIG. 9. Each type of tag may be configured to create tags based on one or more different parameters related to the image content the respective tag describes. For example, a type A tag may be a tag generated based on a focus parameter.

Each tag type also includes tag generation rules 910-N that describe the settings for parameters that result in the generation and application of that tag type. Tag generation rules 910-1, which are associated with type A tags as shown in FIG. 9, indicated that a type A tag is to be generated for respective content when the value of a focus parameter is greater than 0.75. Thus, when analyzing the metadata associated with a first portion of image content, if metadata for the first portion of the image content indicates a focus level greater than 0.75, a type A tag will be generated and applied to the first portion. If only the fourth portion of the image content has metadata that indicates a focus level greater than 0.75, then only the fourth portion of the image content will be tagged with a type A tag.

In some embodiments, different tag types may be combined to form a so-called super tag. A super tag includes a plurality of parameters instead of generation of a tag based on a single parameter. The super tag may be generated based on whether a respective portion of image content has been tagged multiple tags. For example, if a respective portion of the image content is tagged with an in-focus tag, a good color saturation tag, etc., then a quality tag may be applied to the respective image portion to indicate that it is of high quality. Tagging multiple different section of the image content in this way enables a user to find section of the image content of high quality.

In one embodiment, when analyzing the metadata associated with image content and applying different types of tags to the portions of image content, the tag generator 208 (shown in FIG. 1) analyzes the metadata based on a first parameter to tag portions of the image content with a first tag type. Referring to FIG. 9, as described above, a type A tag applies to image content where a focus value is greater than 0.75. If the tag generator 208 finds, for metadata of all frames inclusive between a first frame of image content and a hundredth frame of image content, and between a three hundredth frame of image content and a four hundredth frame of image content, a focus value greater than 0.75, the tag generator 208 will generate a type A tag and apply it to the first hundred frames of the image content (i.e., all frames inclusive between the first and the hundredth frame) and the fourth hundred frames (i.e., all frames inclusive between the three hundredth and the four hundredth frame).

The tag generator 208 will then analyze the metadata based on a second parameter to tag portions of the image content with a second tag type. Referring again to FIG. 9, a type D tag applies to color saturation of the image content, and is generated when the color saturation of respective image content is within a given range X to Y (i.e., tag generation rules 910-4). The tag generator 208 analyzes the metadata to find where the color saturation for portions of image content falls between the range X to Y. If the color saturation for the fiftieth frame to the hundred and fiftieth frame is between the range X to Y, then the tag generator 208 will create a type D tag and apply it to those frames (i.e., all frames inclusive between the fiftieth frame and the hundred and fiftieth frame).

The tag generator 208 then analyzes the metadata based on multiple parameters including the first parameter and the second parameter to tag portions of the image content with a third tag type. This third tag type may be a super tag such as a quality tag as mentioned above. For example, as shown in FIG. 9, a type Q tag (representing a super tag) includes, among other things, a focus parameter and a color saturation parameter. Tag generation rules 910-54 include generating a type Q tag when, among other things, a focus level is greater than 0.75 and when the color saturation is between a range X to Y. Thus, the tag generator 208 analyzes the metadata for the image content to find those frames when both situations from the tag generation rules 910-54 apply. In the above example, the fiftieth to the hundredth frames (inclusive) of the image content include a focus level greater than 0.75 and have a color saturation falling within the range X to Y. Thus, the tag generator 208 will generate and apply a type Q tag to the fiftieth to the hundredth frames (inclusive) of the image content.

Note that as an alternative to generating a so-called super tag based on whether respective portions of the content have multiple applied tags, the analyzer may be configured to generate tags by analyzing multiple different parameters of the metadata 270 and generate a tag accordingly.

As described herein, the analyzer generates different tag types. As shown in FIG. 9, the analyzer uses the tag generation rules associated with a respective tag type to determine under what circumstances to apply the tags. For example, tag generation rules 910-1 specify when to generate a focus type tag or tag A associated with image content, tag generation rules 910-2 specify when to generate a motion type tag or tag B associated with image content, tag generation rules 910-3 specify when to generate a object type tag or tag C associated with image content, tag generation rules 910-4 specify when to generate a color saturation type tag or tag D associated with image content, tag generation rules 910-5 specify when to generate a sound type tag or tag E associated with image content, and so on.

Figure 2:
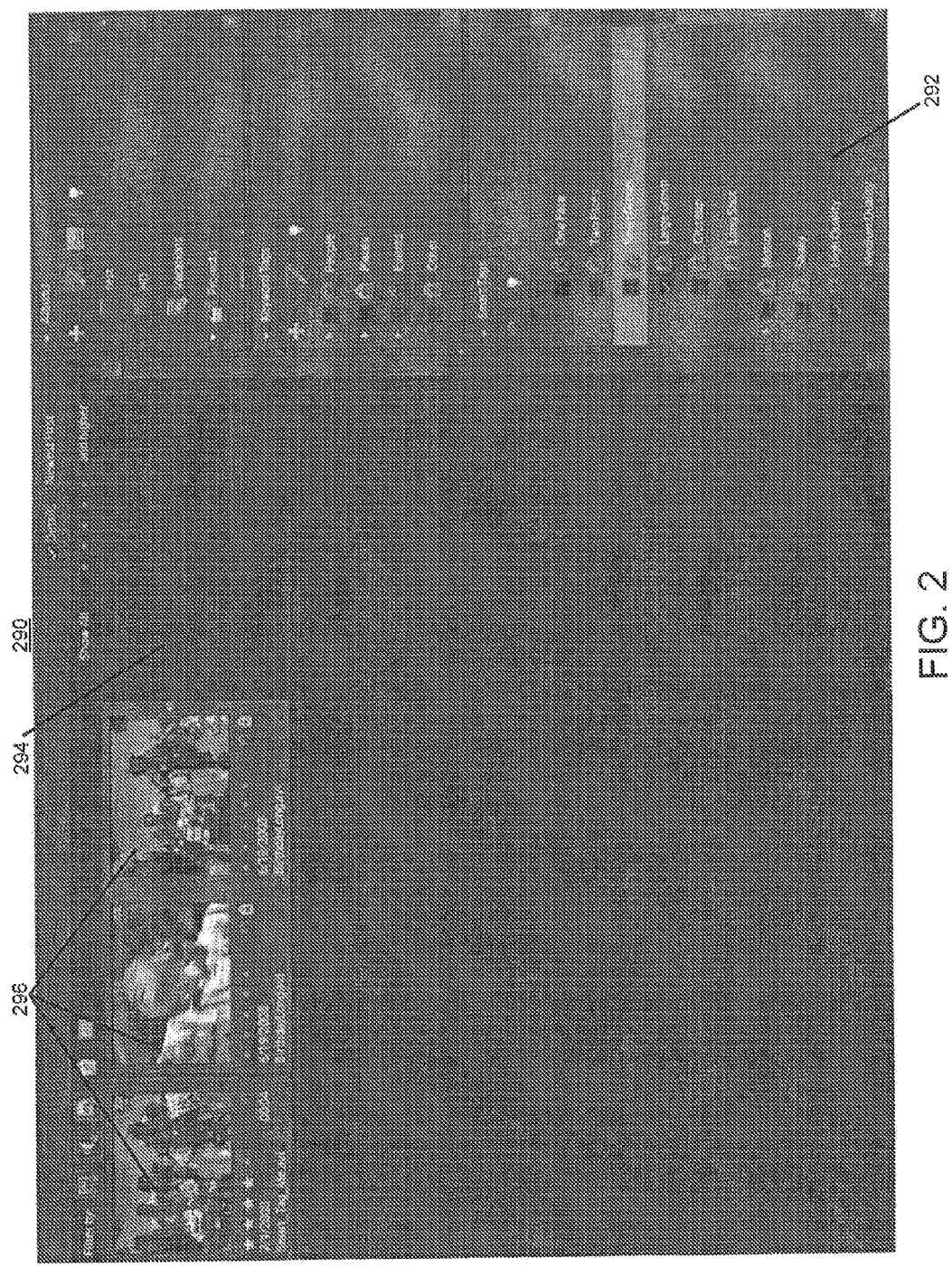
FIGS. 2 and 3 show example graphical user interfaces including image content and smart tags generated for that image content according to embodiments herein.
Figure 3:
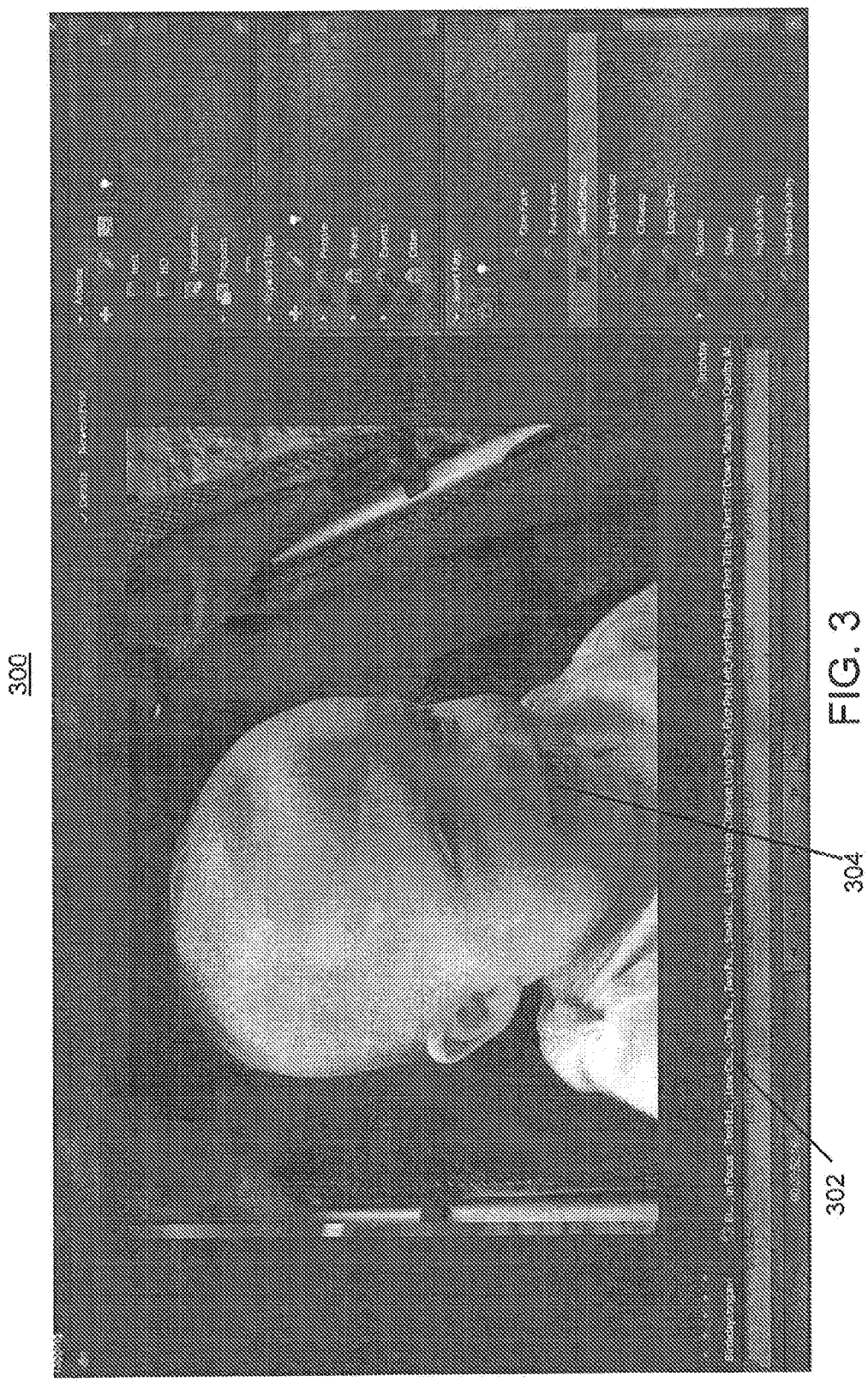
Figure 4:
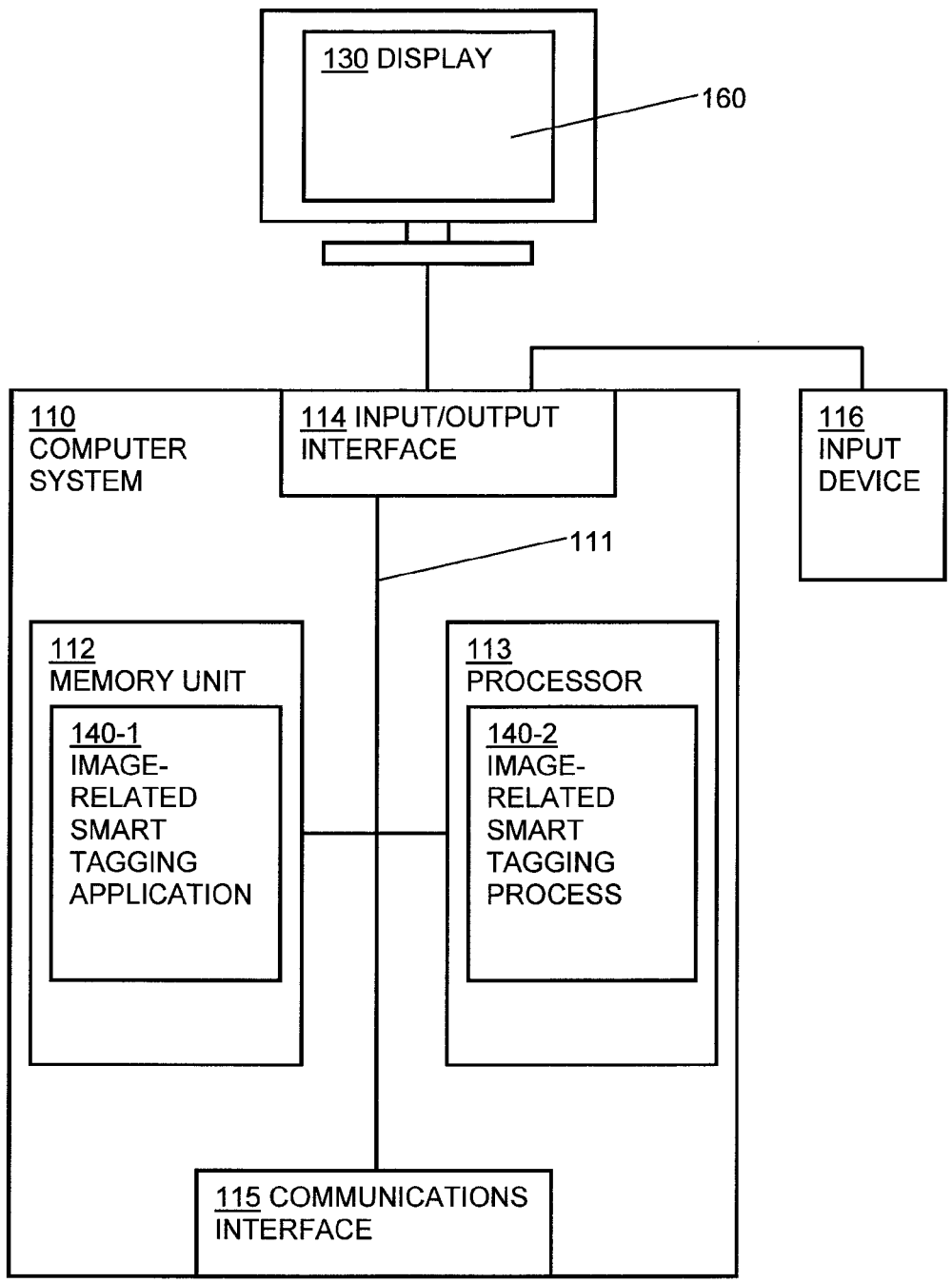
FIG. 4 shows a high-level block diagram of a computer system according to embodiments disclosed herein.

FIGS. 2 and 3 are examples of graphical user interfaces, such as the graphical user interface 232 shown in FIG. 1, including both image content (such as the image content 202 shown in FIG. 1) and smart tags (such as the tags 250, 252, 254, 256, 258, 260, 262, and 264 shown in FIG. 1), that may be produced as described in greater detail herein. FIG. 4 is a block diagram illustrating example architecture of a computer system 110 that executes, runs, interprets, operates or otherwise performs a image-related smart tagging application 140-1 and a image-related smart tagging process 140-2 suitable for use in explaining example configurations disclosed herein. The computer system 110 may be any type of computerized device such as a personal computer, workstation, portable computing device, console, laptop, network terminal or the like. As shown in this example, the computer system 110 includes an interconnect 111 such as a data bus or other circuitry that couples a memory unit 112, a processor 113, an input/output interface 114, and a communications interface 115. An input device 116 (e.g., one or more user controlled devices such as a keyboard, mouse, touchpad, trackball, etc.) couples to the processor 113 through the input/output interface 114 and enables a user, such as a user of a movie editing application, to provide input commands and generally control a graphical user interface 160 shown on a display 130 (which may be equivalent to the display 230 and the graphical user interface 232 shown in FIG. 1). The communications interface 115 enables the computer system 110 to communicate with other devices (e.g., other computers) on a network (not shown in FIG. 4).

The memory unit 112 is any type of computer readable storage medium and in this example is encoded with an image-related smart tagging application 140-1. The image-related smart tagging application 140-1 may be embodied as software code such as data and/or logic instructions (e.g., code stored in the memory unit or on another computer readable storage medium such as a removable disk) that supports processing functionality according to different embodiments described herein. During operation of the computer system 110, the processor 113 accesses the memory unit 112 via the interconnect mechanism 111 in order to launch, run, execute, interpret or otherwise perform the logic instructions of the image-related smart tagging application 140-1. Execution of the image-related smart tagging application 140-1 in this manner produces processing functionality in an image-related smart tagging process 140-2. In other words, the image-related smart tagging process 140-2 represents one or more portions or runtime instances of the image-related smart tagging application 140-1 performing or executing within or upon the processor 113 in the computer system 110 at runtime.

It is noted that example configurations disclosed herein include the image-related smart tagging application 140-1 itself including the image-related smart tagging process 140-2 (i.e., in the form of un-executed or non-performing logic instructions and/or data). The image-related smart tagging application 140-1 may be stored on a computer readable storage medium (such as a floppy disk), hard disk, electronic, magnetic, optical or other computer readable medium. The image-related smart tagging application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the image-related smart tagging application 140-1 in the processor 113 as the image-related smart tagging process 140-2. Those skilled in the art will understand that the computer system 110 may include other processes and/or software and hardware components, such as an operating system not shown in this example.

In some embodiments, the computer system 110 may include the system 200 shown in FIG. 1 as a distinct hardware component that interfaces with the computer system 110 through the communications interface 115. In some embodiments, the computer system 110 includes the system 200 and its components as a software application (not shown) stored in the memory unit 112 that executes as a tagging system process (not shown) in the processor 113.

The display 130 need not be coupled directly to computer system 110. For example, the image-related smart tagging application 140-1 may be executed on a remotely accessible computerized device via the network interface 115. In this instance, the graphical user interface 160 may be displayed locally to a user of the remote computer and execution of the processing herein may be client-server based.

FIGS. 5-8 and 11-12 are flowcharts of various embodiments of the image-related smart tagging process 140-2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 5:
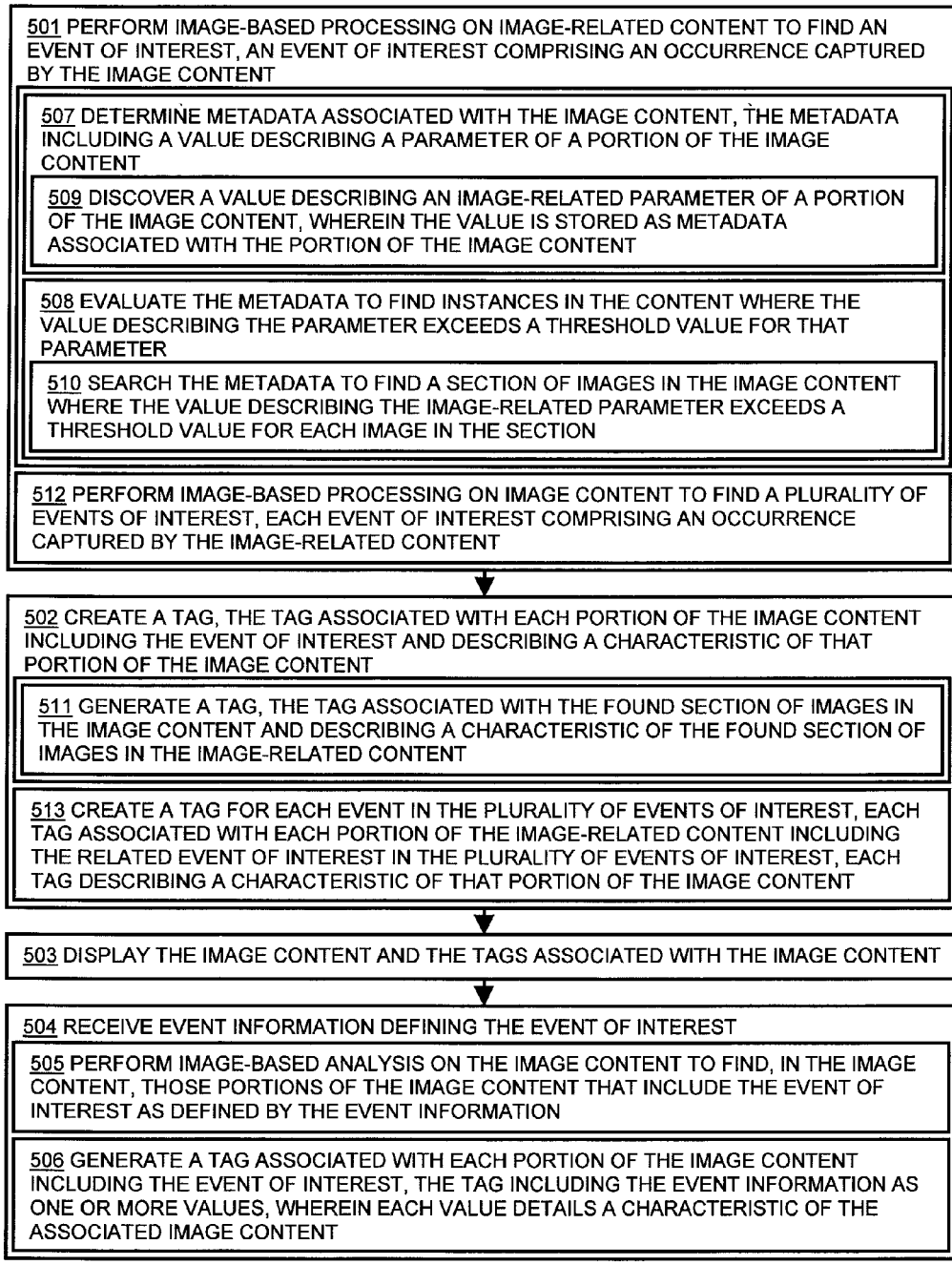
FIG. 5 illustrates a flowchart of a procedure performed by the system of FIG. 4 when generating smart tags for image content according to embodiments herein.

FIG. 5 illustrates the image-related smart tagging application 140-1 executing as the image-related smart tagging process 140-2 to apply one or more smart tags to image content, as described above, and then present the image content and any generated tags to a user, so that the user is able to quickly and easily locate, within the image content, any events of interest. The image-related smart tagging process 140-2 performs perform image-based processing on image content to find an event of interest, step 501, an event of interest comprising an occurrence captured by the image content. That is, an event of interest may include anything that is discernable when viewing the image content. An event of interest may be a simple occurrence captured by the image content, such as the appearance of any person within any portion of the image content. An event of interest may also be a complicated situation captured by the image content, such as a group of six people, three with brown hair, standing outside on the grass during daytime. In some embodiments, as described further herein, the image-related smart tagging process 140-2 is told to find one or more events of interest by a user. Alternatively, or additionally, in some embodiments, the image-related smart tagging process 140-2 may be pre-programmed with one or more default events of interest that the image-related smart tagging process 140-2 automatically finds upon receiving image-based content.

Regardless of how simple or how complex an event of interest is, the image-related smart tagging process 140-2 is able to find an event of interest by using any image-processing analysis techniques and/or algorithms, alone or in combination. By employing these techniques, the image-related smart tagging process 140-2 is able to discern not only what the image content shows when viewed (e.g., a group of five people standing around a table, two people with blue eyes in one frame/image and three people with brown eyes in another, and so on), but also image-related parameters (such as the blurriness, brightness, etc.) of the image content, as is discussed further below. Of course, the image-related smart tagging process 140-2 is able to find more than one event of interest in image content. The image-related smart tagging process 140-2, in such embodiments, performs image-based processing on image content to find a plurality of events of interest, step 512. In those situations, each event of interest comprises an occurrence captured by the image content.

In some embodiments, when performing image-based processing, the image-related smart tagging process 140-2 determines metadata associated with the image content, step 507. The metadata includes a value describing a parameter of a portion of the image content. Thus, metadata may include, but is not limited to, the amount of brightness, contrast, blurriness, and the like in any portion (i.e., image or frame) of image content, as well as the presence of panning, zooming, camera tilting, and so on. Thus, the image-related smart tagging process 140-2 may discover a value describing an image-related parameter of a portion of the image content, step 509. The image-related smart tagging process 140-2 may determine metadata, or otherwise discover a value of a parameter, by employing image-based processing techniques, including those used to determine events of interest. Thus, in some embodiments, an event of interest may include a parameter of the image content that is inherent to, and discoverable from, the information comprising the image content itself, as opposed to data that is stored with the image content upon its creation (e.g., the data and time of creation, the device used to create it, and so on). The image-related smart tagging process 140-2 stores the value as metadata associated with the portion of the image content. The image-related smart tagging process 140-2 then evaluates the metadata to find instances in the content where the value describing the parameter exceeds a threshold value for that parameter, step 508. When the metadata is a value describing an image-related parameter, the image-related smart tagging process 140-2 searches the metadata to find a section of images in the image content where the value describing the image-related parameter exceeds a threshold value for each image in the section, step 510. Note that a section of images may, in some embodiments, refer to a grouping of static images. Additionally, or alternatively, in some embodiments, a section of images may refer to a grouping of dynamic images (i.e., frames) of a video.

Using the results of the image-based processing, the image-related smart tagging process 140-2 is able to create a tag, step 502. A tag may, in some embodiments, include a label of text and/or one or more non-textual (i.e., numeric) values, where the label describes what the tag relates to. A tag is associated with each portion of the image content including the event of interest. Thus, if an event of interest is a person looking to the left, the image-related smart tagging process 140-2 will associate a tag (labeled, perhaps, as "person looking left") with every portion of the image content (i.e., image or frame, or group of images or group of frames) that includes a person looking to the left, as determined by the image-based processing. A tag thus describes a characteristic of that portion of the image content. The characteristic may be, but it not limited to, something captured by the image content, or a parameter describing the image content, as described herein. Of course, the image-related smart tagging process 140-2 may create more than one tag, even from only a single event of interest. That is, a complicated event of interest such as a person with blue eyes outdoors during the day may result in the image-related smart tagging process 140-2 creating, for example, a tag for a person with blue eyes, a tag for an outdoors scene, a tag for a daytime scene, a tag for a person outdoors, a tag for a person shown during daytime, a tag for a person with blue eyes outdoors, a tag for a person with blue eyes during daytime, and a tag for a person with blue eyes outdoors during daytime. The image-related smart tagging process 140-2 may similarly create a tag for each event in a plurality of events of interest, each tag associated with each portion of the image content including the related event of interest in the plurality of events of interest, each tag describing a characteristic of that portion of the image content, step 513. A tag need not be associated with only a single portion (i.e., image or frame) of the image content, but may also be associated with a group of images/frames within the image content. Thus, when the image-related smart tagging process 140-2 finds a section of images in the image content, as described above, the image-related smart tagging process 140-2 generates a tag, step 511, where the tag is associated with the found section of images in the image content and describes a characteristic of the found section of images in the image content.

Figure 10:
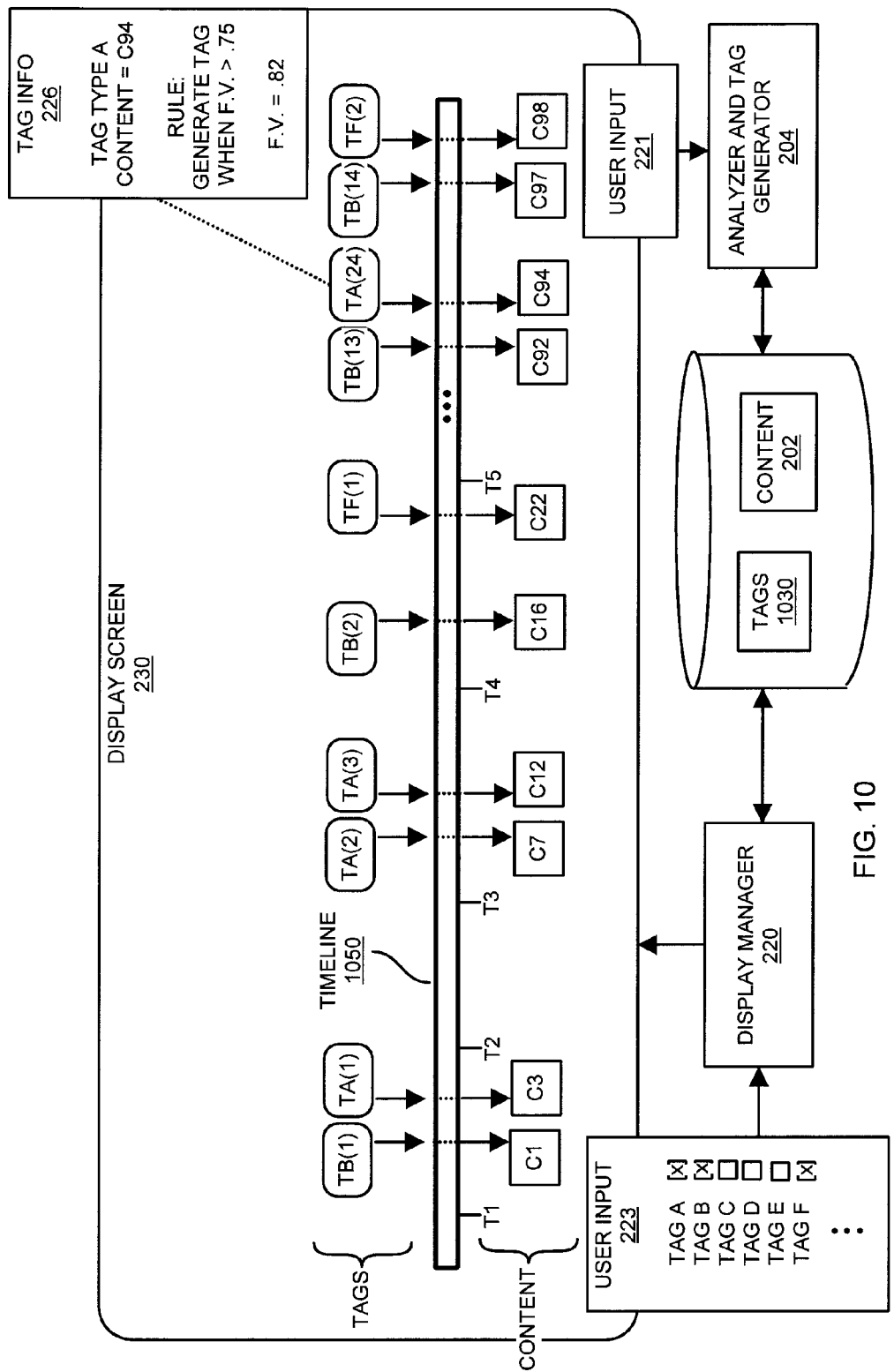
FIG. 10 illustrates a high-level block diagram of system where a plurality of tags are shown in a timeline according to embodiments herein.

In some embodiments, as shown in FIG. 10, the image-related smart tagging process 140-2 (contained within the analyzer and tag generator 204, but not shown in FIG. 10) may receive input (such as user input 221) specifying a user-defined type of tag and corresponding rules indicating which type of image content in which to apply the user-defined tag. Thus, a respective user may define under what circumstances tags are created.

The user-defined tag may be stored or otherwise maintained among a plurality of tags 1030 in a repository or other storage device, which may also contain the image content 202.

As mentioned above, the corresponding rules inform the image-related smart tagging process 140-2 how the image-related smart tagging process 140-2 is to create and apply the user-defined tag to image content. For example, a user-defined tag may be Matt's birthday party, the corresponding rules may indicate that any portions of image content including a birthday cake and Matt in close proximity, or presents and Matt in close proximity, are to be tagged with the Matt's birthday party tag.

Alternatively, or additionally, the image-related smart tagging process 140-2 may receive the input in response to initiating display of a graphical user interface enabling creation of the user-defined tag and the corresponding rules. The corresponding rules specify parameters associated with an object type. That is, upon displaying a graphical user interface on a display screen 230 shown in FIG. 10, the image-related smart tagging process 140-2 may receive user input 221 that includes a user-defined tag, such as outdoor events, and corresponding rules, such as the presence of blue colors near the top of a portion of the image content and green colors near the bottom of a portion of the image content, with a brightness level of 1.0 or greater, indicate an outdoor scene.

In the case of tagging occurrences of sound, the analyzer may be configured to detect presence of particular audible words associated with the image content. Accordingly, portions of the image content may be tagged depending on whether a particular word is spoken in relation to the image content. For example, the analyzer may be configured to tag each portion of content when the word birthday is spoken. The viewer may use the tags to view portions of the image content when the word birthday is spoken.

The image-related smart tagging process 140-2 then applies the user-defined tag to respective portions of the image content as specified by the corresponding rules. In some embodiments, where the corresponding rules specify parameters, the image-related smart tagging process 140-2 analyzes the image content for presence of the object type as specified by the parameters. Thus, the image-related smart tagging process 140-2 would analyze the image content to find where blue colors are near the top of a portion of the image content, green colors were near the bottom of the same portion of the image content, and the brightness level of the same portion of image content was 1.0 or greater. Then, based on the analyzing, the image-related smart tagging process 140-2 identifies a group of at least one portion of the image content having the object type as specified by the parameters, and tags each portion of the image content in the group with the user-defined tag. Thus, the image-related smart tagging process 140-2 would tag each portion of the image content where it found an outdoor scene, according to the above-described parameters, with the outdoor events tag.

After creating any tags, the image-related smart tagging process 140-2 displays the image content and the tags associated with the image content, step 503. The image-related smart tagging process 140-2 may display the image content and the associated tags in any number of ways as described in greater detail herein. By providing the image content and the tags to a user, the image-related smart tagging process 140-2 enables a user to perform various actions on the image content, and particularly enables a user to find desired content quickly and easily by selecting one or more tags.

In some embodiments, a user is able to provide the image-related smart tagging process 140-2 with a description of one or more events of interest that the user wants the image-related smart tagging process 140-2 to find and tag within image content. The user may provide such a description in the form of event information that defines the event of interest. Event information may be, but is not limited to, data that identifies what a user considers to be an event of interest. In some embodiments, event information may include a text-based description of the event of interest, such as "person standing in a room". In some embodiments, event information may include graphical data, such as an image, or short video clip, of a person's face, which the image-related smart tagging process 140-2 is to find, through image-based processing, within the image content. Any technique for providing the image-related smart tagging process 140-2 with a description of an event of interest may be used. However the event information is provided to the image-related smart tagging process 140-2, the image-related smart tagging process 140-2 receives the event information defining the event of interest, step 504, and then performs image-based analysis on the image content to find, in the image content, those portions of the image content that include the event of interest as defined by the event information, step 505. Thus, if the event information is a still image of a particular person's face, the image-related smart tagging process 140-2 will use that image with image-based analysis to find where that person's face appears in the image content. From the results of the image-based analysis, the image-related smart tagging process 140-2 generates a tag associated with each portion of the image content including the event of interest, step 506. The tag includes the event information as one or more values. Each value in the tag details a characteristic of the associated image content.

Figure 6:
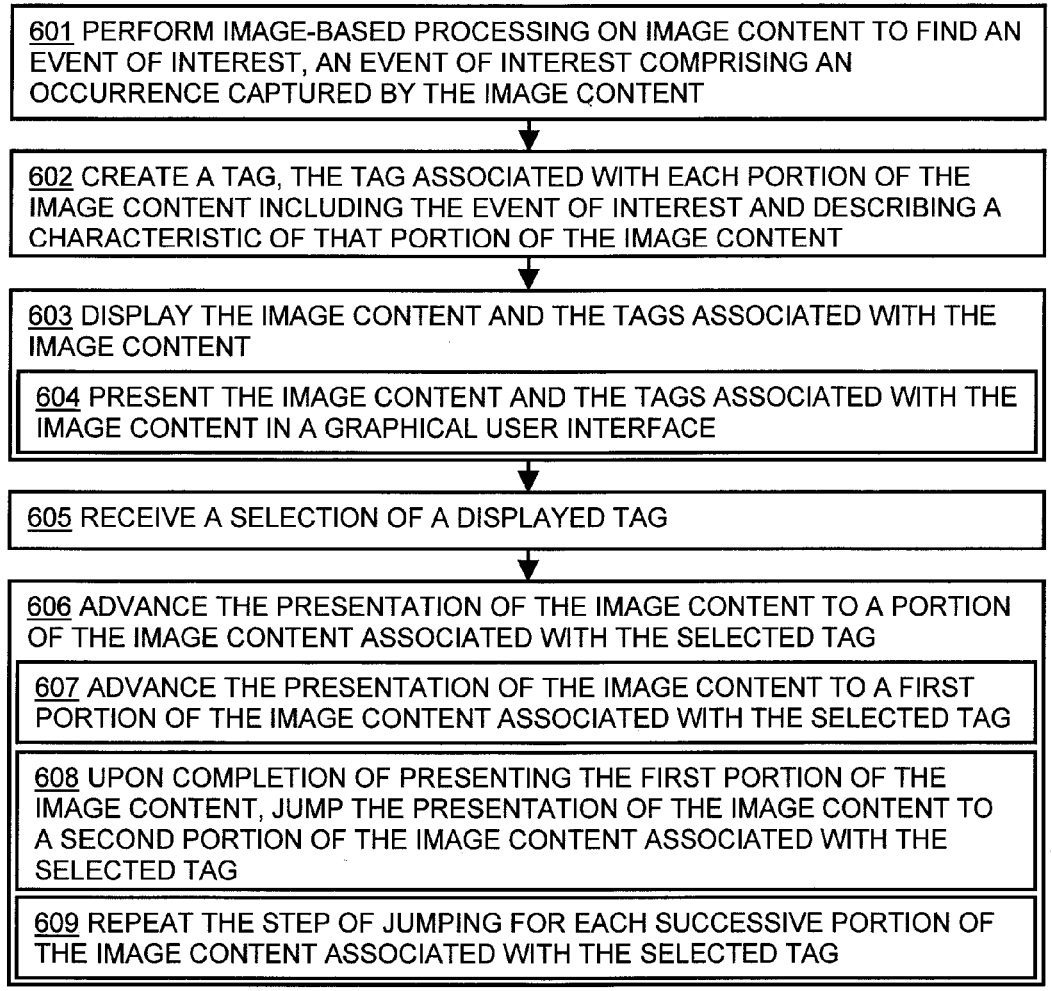
FIG. 6 illustrates a flowchart of a procedure performed by the system of FIG. 4 when jumping through the presentation of image content according to a selection of smart tag(s).

In FIG. 6, the image-related smart tagging process 140-2 jumps within the presentation of the image content according to a selection of tags. The image-related smart tagging process 140-2 first performs image-based processing on image content to find an event of interest, an event of interest comprising an occurrence captured by the image content, step 601, as described herein. The image-related smart tagging process 140-2 then creates a tag, step 602. The tag is associated with each portion of the image content including the event of interest and describing a characteristic of that portion of the image content. Of course, the image-related smart tagging process 140-2 may create more than one tag for any entity of image content. The image-related smart tagging process 140-2 next displays the image content and the tags associated with the image content, step 603. The image-related smart tagging process 140-2 does this by presenting the image content and the tags associated with the image content in a graphical user interface, step 604. The image-related smart tagging process 140-2 may present image content and associated tags in any number of ways. In some embodiments, the image-related smart tagging process 140-2 may place one or more images of any size representative of the image content on the graphical user interface. In some embodiments, the image-related smart tagging process 140-2 may place one or more video clips, of any size, or entire videos, on the graphical user interface. The image-related smart tagging process 140-2 may begin playing the clip(s) or video(s) upon placing them in the graphical user interface, or may wait to begin playing the clip(s) or video(s) until the image-related smart tagging process 140-2 receives a command initiated by a user on the graphical user interface. For tags, the image-related smart tagging process 140-2 may show all of the tags in a table, list, or other graphical grouping element, or may show only a subset of all of the tags, in a tree-format (i.e., hierarchy), a drop down menu, or the like. The tags and/or the image content, however presented, may be selectable by a user providing input to the image-related smart tagging process 140-2 via the graphical user interface.

An example of a graphical user interface in which the image-related smart tagging process 140-2 may present image content is shown in FIG. 2. A graphical user interface 290 includes, on its right-hand side, a number of tags 292 grouped in a hierarchical format, though as described above, the tags may be presented in any way. Groups of tags within the hierarchy have been selected, as shown by the checkmark in the checkbox next to those groups. The graphical user interface 290 also includes, in a region 294 on its left-hand side, a number of representations of the image content processed by the image-related smart tagging process 140-2, for which the associated tags 292 are shown. In FIG. 2, the representations are a series of thumbnail images 296, each of which is a frame from a video. It is possible to select one or many of the tags 292, as well as one or more of the images 296. Selecting one or more different tags 292, or one or more images 296, or some combination or both, may result in a number of actions occurring. In some embodiments, selecting a representation may cause the image-related smart tagging process 140-2 to, if the image content includes video, play the video. Alternatively, or additionally, if the image content includes images, selecting the representation may cause the image-related smart tagging process 140-2 to display the images, either as individual images in a sequence (i.e., a slideshow), or in a series of groups of images (i.e., 4 images shown at a time). Further, any related audio content may also be played. In some embodiments, the selection of tags determines what representation(s) of the image content the image-related smart tagging process 140-2 presents on the graphical user interface 290, as described in greater detail in co-pending application U.S. Ser. No. 12/196,101, entitled "MANAGEMENT OF SMART TAGS VIA HIERARCHY" and filed herewith. Thus, selecting different tags 292 may result in a change in the representations the image-related smart tagging process 140-2 presents in the graphical user interface 290. In some embodiments, when a user selects a displayed tag, the image-related smart tagging process 140-2 receives the selection, step 605. In response, the image-related smart tagging process 140-2 advances the presentation of the image content to a portion of the image content associated with the selected tag, step 606. In other words, if the image content includes a video, the image-related smart tagging process 140-2 may play the video, starting from the first frame in the video that is associated with the selected tag. If the image content includes images, the image-related smart tagging process 140-2 may show the first image (or group of images) associated with the selected tag. Alternatively, if the image-related smart tagging process 140-2 was already playing the video, or displaying one or more images, the image-related smart tagging process 140-2 may go to a frame in the video/image associated with the selected tag, and continue playback from that frame/display from that image. The image-related smart tagging process 140-2 may go to any frame/image associated with the tag, though may in some embodiments go to the first frame/image that the selected tag is associated with. Thus, the image-related smart tagging process 140-2 may advance the presentation of the image content to a first portion of the image content associated with the selected tag, step 607, where that first portion is any portion of the image content. Upon completion of presenting the first portion of the image content, the image-related smart tagging process 140-2 jumps the presentation of the image content to a second portion of the image content associated with the selected tag, step 608. The image-related smart tagging process 1402 then repeats the step of jumping for each successive portion of the image content associated with the selected tag, step 609. In this way, the image-related smart tagging process 140-2 is able to show a user each portion of content that is associated with a selected tag. Of course, a user may select any number of tags, and is not limited to selecting only a single tag. In embodiments where the user selects more than one tag, the image-related smart tagging process 140-2 cycles through the portions of content associated with each selected tag, and may do so in any order, sequential, random, user-determined, and so on.

FIG. 7 illustrates an embodiment where the image-related smart tagging process 140-2 applies smart tags already created and applied to an original item of image content to a further item of image content. For example, the image-related smart tagging process 140-2 may perform image-based processing on image content, say a video of a party recorded in January 2007, to find an event of interest, step 701, as otherwise described herein. An event of interest comprises an occurrence captured by the image content. Here, the image-related smart tagging process 140-2 may find many events of interest in connection with the January 2007 party. The image-related smart tagging process 140-2 then creates a tag, step 702, for each of the occurrences of the found events of interest. Each tag the image-related smart tagging process 140-2 creates is associated with each corresponding portion of the image content that includes the event of interest. Each tag describes a characteristic of that portion of the image content, as discussed above. The image-related smart tagging process 140-2 then displays the image content and the tags associated with the image content, step 703, here being the video of the January 2007 party and its tags.

The image-related smart tagging process 140-2 may then receive new image content, step 704. The new image content is distinct from original image content. That is, the new image content is a separate entity (i.e., file, clip, etc.) from the original image content that includes at least some content that is not present in the original image content. Thus, the new image content may, but does not need to be, related to the original image content. For example, the image-related smart tagging process 140-2 may receive video of a party recorded in January 2008. The two videos may represent recordings of the same person's birthday party, one for the person's birthday in 2007 and the other for the person's birthday in 2008. The image-related smart tagging process 140-2 automatically applies the tags created for the original image content to the new image content, step 705, to locate portions of the new image content including the events of interest described by the tags. Using the birthday party video example, a tag created for the January 2007 video may have been birthday cake, to represent any frames of the video including the birthday cake. The image-related smart tagging process 140-2 applies the birthday cake tag to the January 2008 video, and thus finds any frames in the January 2008 video that include the birthday cake from that party. The image-related smart tagging process 140-2 then associates the tag(s), in this example, the birthday cake tag, with any located portions of the new image content, step 706. The image-related smart tagging process 140-2 performs this association for each tag the image-related smart tagging process 140-2 finds content describing the event(s) associated with that tag in the new image content. If the image-related smart tagging process 140-2 is unable to locate any portions of content within the new image content that describe the event of interest detailed by a tag from the original image content, the image-related smart tagging process 140-2 does not associate that tag with any portion of the new image content. In other words, one of the tags associated with portions of the January 2007 video may be a tag identifying Aunt Mary, but Aunt Mary may not be in any of the frames of the January 2008 video because Aunt Mary might have been unable to attend the January 2008 birthday party. Thus, the image-related smart tagging process 140-2 will not associate the Aunt Mary tag from the January 2007 video with any portions of the January 2008 video.

The image-related smart tagging process 140-2 presents, step 707, the original image content, the new image content, and the tags associated with each. In some embodiments, the image-related smart tagging process 140-2 may present these items in a graphical user interface, so that a user is able to select any of the items. When the image-related smart tagging process 140-2 receives a selection of a tag that is associated with a portion of the original image content and with a portion of the new image content, step 708, the image-related smart tagging process 140-2 advances the presentation of both portions, step 709. That is, the image-related smart tagging process 140-2 advances the original image content to a portion of the original image content associated with the selected tag, and simultaneously advances the new image content to a portion of the new image content associated with the selected tag. This allows a user to find similar, or related, events of interest in different entities of image content, such as finding the portions of the two videos described above (i.e., the January 2007 and the January 2008 videos) where the person celebrating their birthday blows out the candles on their birthday cake in two different years. Of course, though the above description has been of two entities of image content, embodiments are not so limited and the above procedures may be applied to any number of entities of image content. The only limitation on the number of entities of image content that the image-related smart tagging process 140-2 may act upon in such situations is that there must be at least one portion in each entity that includes an occurrence captured by that content and described in at least one tag of the original image content. Otherwise, the image-related smart tagging process 140-2 will be unable to automatically associate any of the tags from the original image content with that entity of new image content.

In some embodiments, where the image content is first image content in which tags are produced, in response to receiving a command to apply tags to second image content, the image-related smart tagging process 140-2 identifies different types of tags already applied to the first image content. Thus, the image-related smart tagging process 140-2 may examine the first image content, such as the January 2007 video described above, and determines that event type tags, motion type tags, and people type tags, among others, have been applied to the January 2007 video. The image-related smart tagging process 140-2 then analyzes metadata associated with the second image content, such as the results of image analysis performed on the January 2008 video to indicate, among other things, who attended the party captured by the January 2008 video. Based on the type of tags applied to the first content, the image-related smart tagging process 140-2 analyzes metadata associated with the second content to produce a set of tags for the second image content, and then applies those tags to the second image content. For example, the set of tags the image-related smart tagging process 140-2 applies to the second image content include at least a portion of a same type of tags applied to the first image content. Thus, the image-related smart tagging process 140-2 applies, among other tags, people type tags to the January 2008 video, to indicate those people present at the party captured by the January 2008 video.

Figure 8:
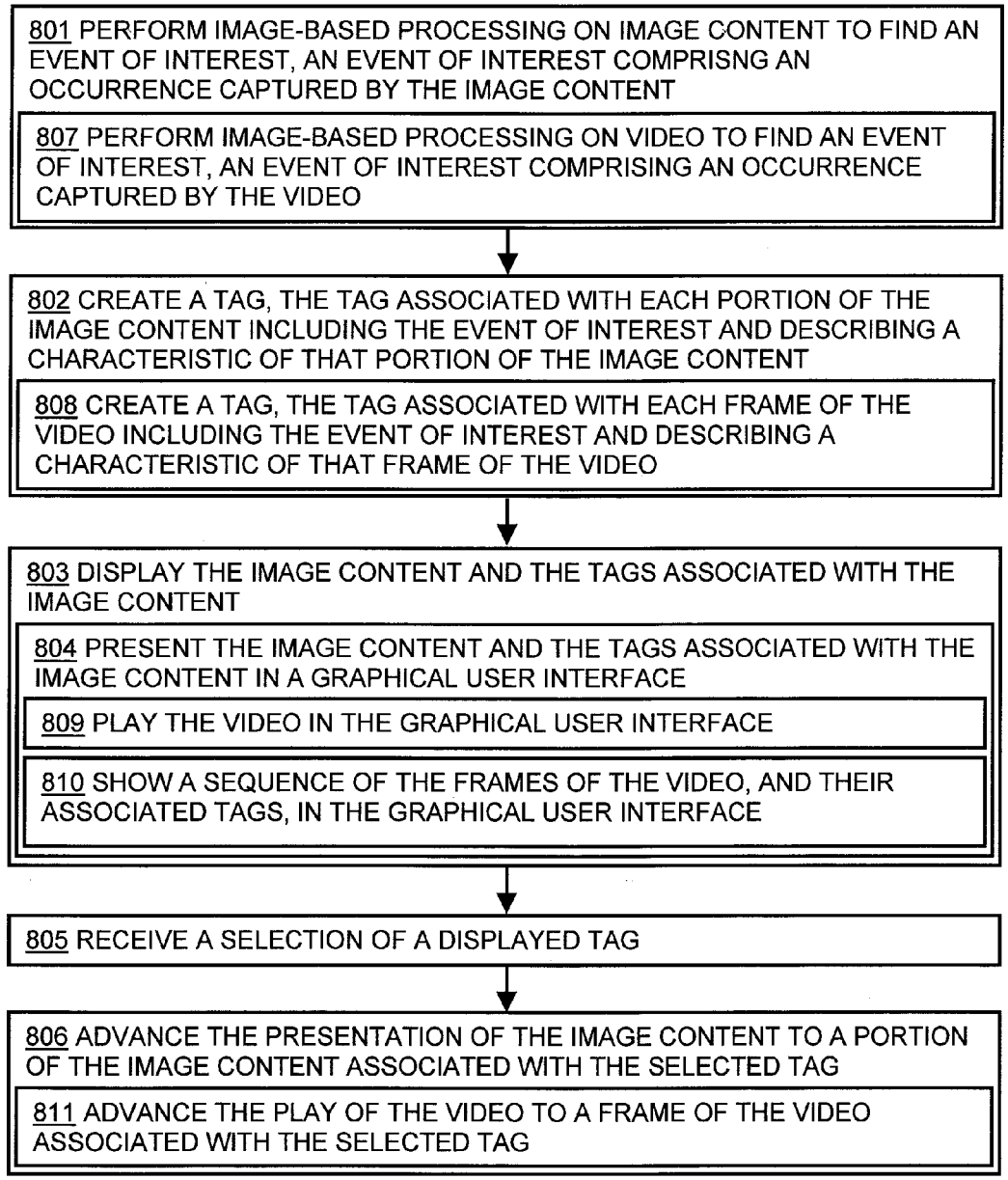
FIG. 8 illustrates a flowchart of a procedure performed by the system of FIG. 4 when generating smart tags for video.

In FIG. 8, the image-related smart tagging process 140-2 receives content that is video and creates and displays tags for the video that allow a user to quickly and easily find occurrences of any event or events of interest within the video. The image-related smart tagging process 140-2 first performs image-based processing on image content to find an event of interest, step 801. As described herein, an event of interest comprises an occurrence captured by the image content. More particularly, according to one embodiment, the image-related smart tagging process 140-2 performs image-based processing on video to find an event of interest, an event of interest comprising an occurrence captured by the video, step 807. Thus, an event of interest may be any occurrence that happens in the video, such as the appearance of a particular face. Alternatively, or additionally, the event of interest may be a parameter related to the quality of the video (i.e., blurriness, brightness, etc.) or the capturing of the video (i.e., pan left, zoom in, zoom out, etc.), or audio data captured along with the images comprising the video (i.e., a word or phrase in the video). The event of interest may occur in a single image or frame of the video, or in a series of images/frames of the video (i.e., a clip).

The image-related smart tagging process 140-2 then creates a tag, step 802, the tag associated with each frame of the video including the event of interest, step 808. The tag describes a characteristic of that frame of the video. Thus, if the event of interest is the appearance of a particular person's face, the image-related smart tagging process 140-2 performs image-based processing on the video, frame by frame, to find all frames in which that person's face appeared, and then tags each of those frames with a tag corresponding to that person's face. The tag may describe, for example, the person's face, by simply identifying the person's face (i.e., "Josh's face"). As described herein, note that an event of interest may be as simple or complicated as a user desires, and thus a tag may be simple or complicated as well.

The image-related smart tagging process 140-2 next displays the image content and the tags associated with the image content, step 803, by presenting the image content and the tags associated with the image content in a graphical user interface, step 804. An example of this may be seen in FIG. 3, where the image-related smart tagging process 140-2 displays a list of selected tags 302 at the bottom of a graphical user interface 300 and shows a screenshot 304 of the video. More particularly, the image-related smart tagging process 140-2 may play the video in the graphical user interface, step 809, and show a sequence of the frames of the video, and their associated tags, in the graphical user interface, step 810. The sequence of frames corresponds to the frames of the video that are associated with the selected tags. A user is then able to select a frame of the video to view that portion of the video. The image-related smart tagging process 140-2 receives the selection of the frame, and advances playback of the video in the graphical user interface to the selected frame. Alternatively, the user may select a tag, so as to view the next portion of the video that includes the event described by that tag. In other words, the image-related smart tagging process 140-2 receives a selection of a displayed tag, step 805, which causes the image-related smart tagging process 140-2 to advance the presentation of the image content to a portion of the image content associated with the selected tag, step 806. More particularly, the image-related smart tagging process 140-2 may advance the play of the video, step 811, to a frame of the video associated with the selected tag. That frame includes the event of interest described by the tag, such as the appearance of Josh's face.

Figure 11:
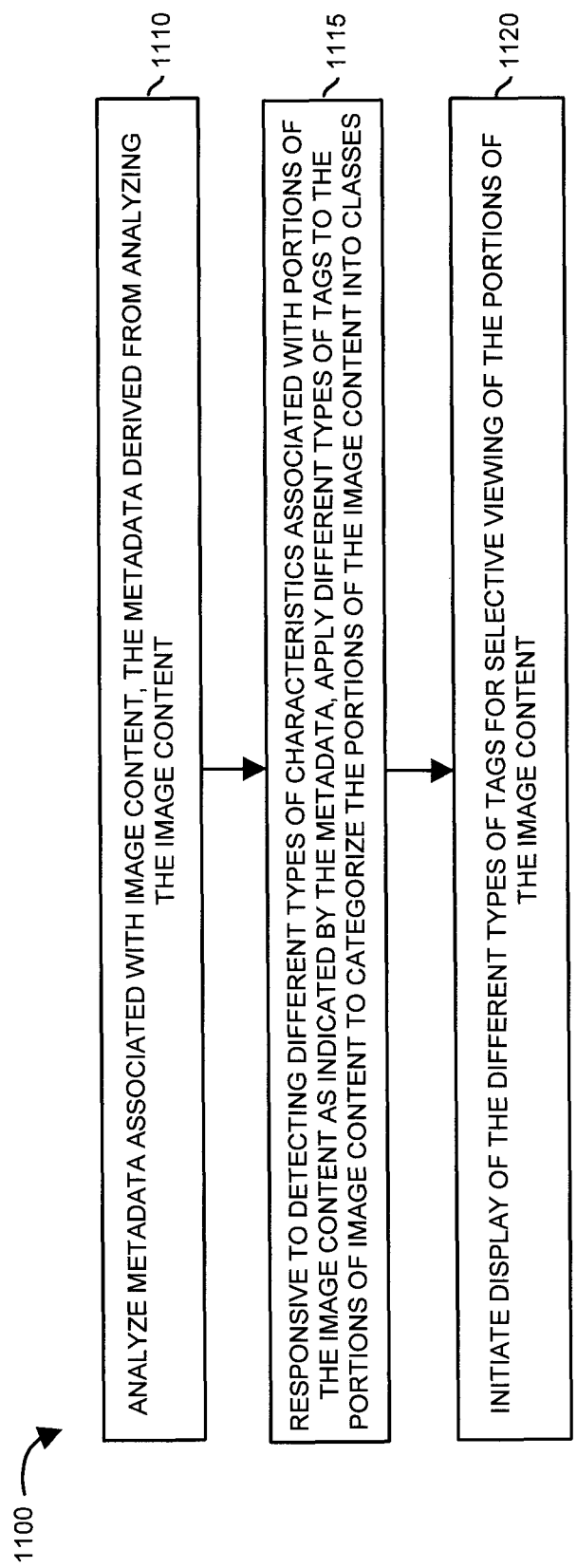
FIG. 11 illustrates a flowchart of applying tags to portions of image content based on metadata derived from analysis performed on the image content according to embodiments herein.

In FIG. 11, the image-related smart tagging process 140-2 applies tags to portions of image content based on metadata derived from analysis performed on the image content according to a procedure shown by a flowchart 1100. That is, the image-related smart tagging process 140-2 analyzes metadata associated with image content, step 1110. The metadata is derived from analyzing the image content. The metadata describes the image content, and more particularly, describes different types of characteristics of the image content, such as but not limited to image-related parameters (i.e., brightness, focus, contrast, color balance, etc.) as well as subject-matter parameters (i.e., number of people present in a portion of the image content, objects present, etc.).

Responsive to detecting different types of characteristics associated with portions of the image content as indicated by the metadata, the image-related smart tagging process 140-2 applies different types of tags to the portions of image content to categorize the portions of the image content into classes, step 1115. Thus, the image-related smart tagging process 140-2 may have a class of portions of image content that include people, as identified by the metadata showing the presence of people in the image content, and a class of portions of image content that includes image content that is out of focus, as identified by the metadata indicating image content to be out of focus. In some embodiments, the different types of characteristics for tagging the image content are based on a group of image parameters that consists of: panning, zooming, camera tilting, static scenes, objects, faces, location of faces, sizes of faces, focus, shakiness of camera, brightness, contrast.

Finally, the image-related smart tagging process 140-2 initiates display of the different types of tags for selective viewing of the portions of the image content, step 1120. The image-related smart tagging process 140-2 may display the different types of tags in any way as described herein.

In some embodiments, as shown in FIG. 10, the image-related smart tagging process 140-2 may initiate display of different types of tags 1030 using a timeline presented to a user via a display screen 230. That is, the image-related smart tagging process 140-2 initiates display of a timeline 1050 associated with the image content 202. The timeline 1050 represents a sequence of time of the image content 202, but does not necessarily include any of the image content 202.

In one embodiment, the image-related smart tagging process 140-2 then populates the timeline 1050 with the different types of tags 1030 applied to the image content 202 to indicate relative times when different events occur in the image content 202. Thus, for example, as shown in FIG. 10, the first instance of tag type B (TB(1)), which may be a tag for detected motion in image content 170. Tag TB(1) is associated with content portion C1, which happens to be close in time to the first instance of tag type A (TA(1)), which may be a focus type tag associated with content portion C3.

Note that, according to one embodiment, the content C1, C3, C7, C12, C16, etc. may not initially be shown with respect to timeline 1050 even though tags TB(1), TA(1), TA(2), etc. may be shown in relation to timeline 1050. In such an embodiment, the viewer may comprehend the type of content associated with image content 170 without having to actually view the respective images, sound, etc. associated with content 170.

In one embodiment, the tagged portions of content such as C1, C3, C7, etc., may be displayed in response to user input such as a request to display thumbnails of images representing the tagged portions. In another embodiment, the display manager 132 may be configured to initiate display of a respective tagged content portion in response to selection of the corresponding displayed tag. For example, in response to clicking on the tag TB(1), the display manager 132 may initiate display of tagged content portion C1. In response to clicking on the tag TA(1), the display manager 132 may initiate display of tagged content portion C3, and so on.

Similarly, the fourteenth instance of tag type B (TB(14)), a motion tag associated with content portion C97, occurs close in time to the second instance of tag type F (TF(2)), which indicates presence of a content portion 98 illustrating a a small group of people. This allows a user viewing the display screen 230 to know, without viewing the image content 202 or any portion thereof, that the image content 202 includes motion events at the time identified by the first instance of tag type B and a well focused image as specified by the first instance of tag type A, and that the image content 202 includes a person's face as part of a small group of people around the time as identified by the second instance of tag type F.

In some embodiments, image content is a video sequence of multiple frames of images. Each frame may be tagged with multiple tags.

As mentioned above, the image-related smart tagging process 140-2 then applies the different types of tags to the portions of image content by tagging the multiple frames of images. The image-related smart tagging process 140-2 then initiates display of the different types of tags by initiating display of a timeline 1050 associated with the video sequence. Thus, referring to FIG. 10, the timeline 1050, may be a representation of a sequence of time that corresponds with a sequence of video, where the sequence of video is the content identified by content portions C1 . . . C98. The image-related smart tagging process 140-2 then populates the timeline 1050 with symbols (not shown in FIG. 10). The symbols represent the different types of tags and indicate different occurrences of events in the video sequence as specified by the different types of tags. A symbol may be, for example, a graphical element representing a generic face, such as a smiley face. The smiley face symbol may represent a faces type tag, and the image-related smart tagging process 140-2 places the smiley face symbol on the parts of the timeline corresponding to where, in the sequence of video, a person's face appears (and thus the faces tag is applied). The symbols used by the image-related smart tagging process 140-2 may be user supplied, such as through the user input 221, or may be pre-programmed into the image-related smart tagging process 140-2.

In some embodiments, the image-related smart tagging process 140-2 image-related smart tagging process 140-2 may allow for selection of at least one tag. For example, as shown in FIG. 10, a hierarchy of tags A, B, C, D, E, F, . . . may be presented on the display screen 230 or otherwise provided to a user. The user is then able to select at least one of the tags, such as the tags A, B, and F selected as shown in FIG. 10. This user input 223 is then provided to the display manager 220. In response to receiving the selection of a given tags (i.e., one of the tags A, B, and F), the image-related smart tagging process 140-2 initiates display of tag information associated with the given tag, the tag information providing an indication why the tag was created for the corresponding portion of the content image. That is, in response to receiving the selection of tag A via the user input 223, the image-related smart tagging process 140-2 shows tag information 226 on the display screen 230. The tag information 226 includes the type of tag (i.e., a type A tag), the content to which the tag is applied (i.e., content portion C94), the rule used to generate the tag, and the metadata derived from an analysis of the content portion C94 (i.e., F.V.=0.82), which caused the generation of the tag according to the rule. The image-related smart tagging process 140-2 would similarly display tag information for a type B tag and a type F tag as well, as these were also selected according to the user input 223.

In addition to allowing a user to view and understand why a particular tag was created, by showing the tag information, the image-related smart tagging process 140-2 may, in some embodiments, allow a user to adjust the creation of a tag. That is, when the image-related smart tagging process 140-2 applies the different types of tags to the portions of image content, the image-related smart tagging process 140-2 receives rule information specifying parameters indicating circumstances in which to generate a first set of respective tags for portions of the image content. This rule information may be, for example, the rule as shown in the tag information 226 of FIG. 10, i.e., that a type A tag is generated when a value for focus (i.e., F.V.) found in the metadata of a portion of image content is greater than 0.75. The 0.75 value may have been preset by the user, or may have been otherwise derived by the image-related smart tagging process 140-2, to represent a sharp focus for image content. When following this rule, however, the image-related smart tagging process 140-2 may generate tags and apply type A tags to portions of image content that are not as sharp as the user would desire. Thus, the user determines that the focus level setting in the rule is too low, and desires to change it to a higher value, say 0.80. The user would then provide this as input to the image-related smart tagging process 140-2. In response to receiving such input modifying the parameters for creating the respective tags, the image-related smart tagging process 140-2 deletes the first set of respective tags, and re-analyzes the metadata to produce a second set of tags according to the modified parameters. Thus, the image-related smart tagging process 140-2 would remove the current set of type A tags shown in FIG. 10, and would replace them with a set of type A tags that were generated and applied only for those portions of image content with a focus value greater than 0.80. Thus, the type A tag labeled TA(24), for which the tag information 226 is shown, would continue to exist and could be displayed as described above (though it would likely include a different label due to the modification of the rule).

Figure 12:
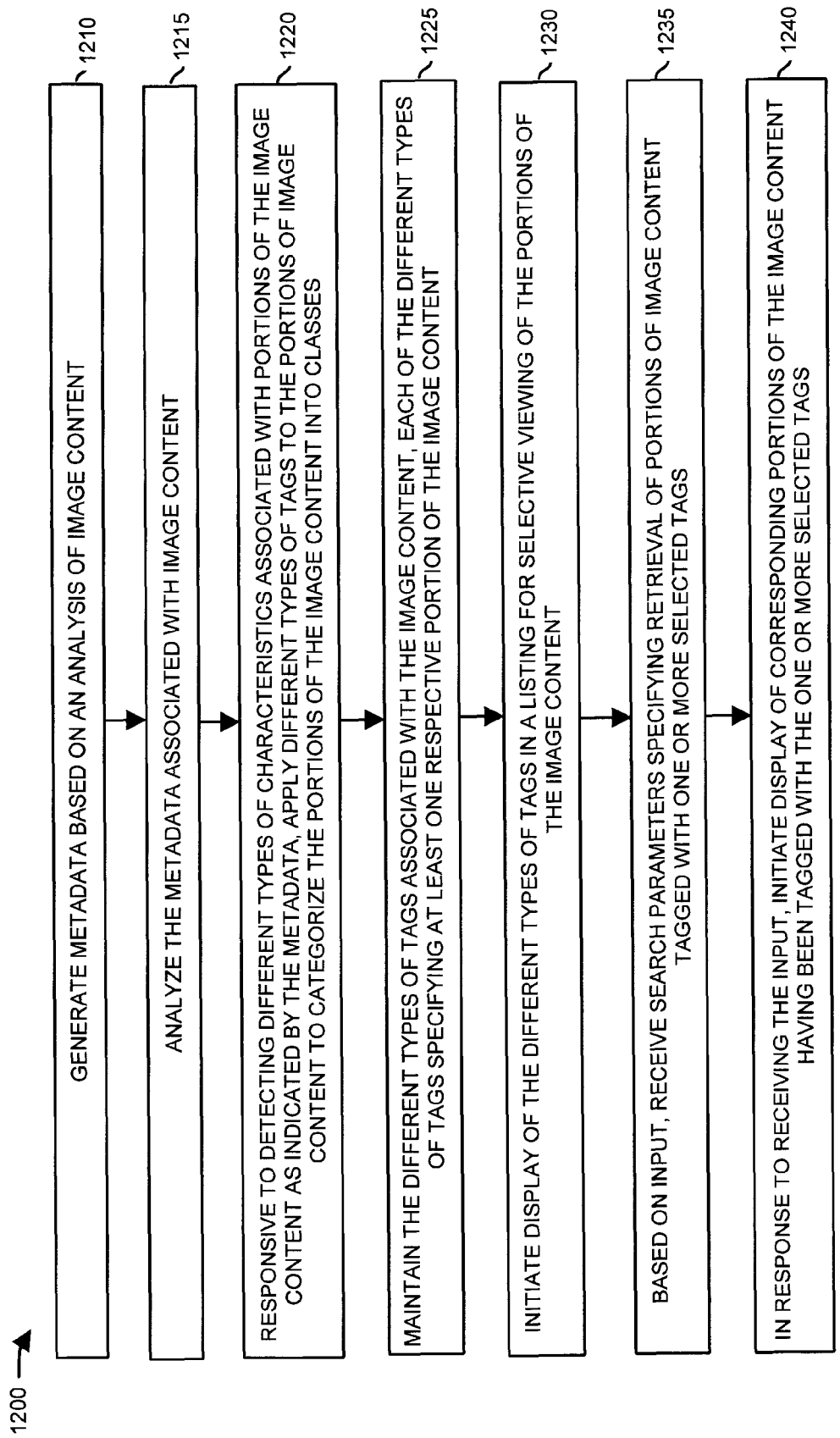
FIG. 12 illustrates a flowchart of displaying different types of tags and performing searches on the displayed different types of tags according to embodiments herein.

FIG. 12 illustrates the image-related smart tagging process 140-2 displaying different types of tags and performing searches on the displayed different types of tags according to a procedure shown by a flowchart 1200. The image-related smart tagging process 140-2 first generates metadata based on an analysis of image content, step 1210. That is, the image-related smart tagging process 140-2 receives image content (such as image content 202 shown in FIG. 1) and analyzes it to create metadata (such as metadata 270 shown in FIG. 1). The metadata describes the image content, as discussed above. The image related smart tagging process 140-2 then analyzes the metadata associated with image content, step 1215. By analyzing the metadata, the image-related smart tagging process 140-2 is able to detect the different types of characteristics associated with portions of the image content as indicated by the metadata. The image-related smart tagging process 140-2 then applies different types of tags to the portions of image content to categorize the portions of the image content into classes, step 1220, responsive to the detection of the different types of characteristics, as described in greater detail above.

The image-related smart tagging process 140-2 then maintains the different types of tags associated with the image content, step 1225. That is, the image-related smart tagging process 140-2 stores or otherwise records the different types of tags in, for example, a storage device (such as the storage device 210 shown in FIG. 1) or a tag repository. Each of the different types of tags specifies at least one respective portion of the image content. The image-related smart tagging process 140-2 initiates display of the different types of tags in a listing for selective viewing of the portions of the image content, step 1230. The listing may be arranged in any known way. Based on input, for example, user input, the image-related smart tagging process 140-2 receives search parameters specifying retrieval of portions of image content tagged with one or more selected tags, step 1235. A user may desire to search, for example, for image content containing the user's face, and only the user's face. The user will then provide appropriate search parameters (e.g., if the user is named Alex, "Alex's face and no other faces" may be the search parameters) to the image-related smart tagging process 140-2. In response to receiving the input, the image-related smart tagging process 140-2 initiates display of corresponding portions of the image content having been tagged with the one or more selected tags. Thus, the image-related smart tagging process 140-2 will display those portions of the image content that include Alex's face, and only Alex's face, as identified by the Alex's face tag (a face type tag) and no other face type tags.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix®, Oracle®) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Those skilled in the art may make many additional changes in the details, materials, and arrangement of parts, herein described and illustrated.

What is claimed is:

1. A method comprising:
    receiving, by a processor, an input describing an event of interest, wherein the event of interest comprises at least one quality parameter associated with a specified range of values for the quality parameter and at least one of a specified person or a specified object;
    responsive to receiving the input describing the event of interest, analyzing, by the processor, a plurality of images depicting a motion with respect to the specified person or the specified object to determine which of the plurality of images include the event of interest, wherein analyzing the plurality of images comprises:
        for each of the plurality of images, generating a respective value for the at least one quality parameter based on a comparison of at least one image of the plurality of images with at least another image of the plurality of images, and
        identifying a subset of images of the plurality of images depicting the motion for which the respective value is within the specified range; and
    based on analyzing the plurality of images, generating, by the processor, a respective tag for each image of the subset of images including the event of interest.

2. The method of claim 1, wherein receiving the input describing the event of interest comprises the input identifying the event of interest in a first image and wherein analyzing the plurality of images comprises determining that the event of interest is in a second image different from the first image.

3. The method of claim 1, wherein the event of interest further comprises one or more physical characteristics of the least one of the specified person or the specified object.

4. The method of claim 1, wherein the event of interest further comprises a position in a respective image of the least one of the specified person or the specified object.

5. The method of claim 1, wherein the event of interest further comprises at least one additional quality parameter different from the at least one quality parameter and wherein analyzing the plurality of images comprises determining which of the plurality of images includes image content having an additional respective value for the at least one additional quality parameter that is within an additional specified range.

6. The method of claim 5, wherein the wherein the at least one quality parameter and the at least one additional quality parameter each comprises at least one of panning, zooming, camera tilting, focus, shakiness of camera, brightness, or contrast.

7. The method of claim 1, wherein the plurality of images comprises video content.

8. The method of claim 7, wherein generating the respective tag for each image of the subset of images comprises generating a first respective tag for a first subset of images in the video content having the event of interest and generating a second respective tag for a second subset of images in the video content, wherein one or more intervening images in the video content between the first subset of images and the second subset of images lacks the event of interest and further comprising:

receiving, by the processor, additional input comprising a command to initiate display the video content having the event of interest;

initiating display of the first subset of images and the second subset of images consecutively by omitting the one or more intervening images from display.

9. The method of claim 1, wherein generating the respective tag for each image of the subset of images comprises, for each image of the subset of images, generating a tag for each portion of the image having image content corresponding to the event of interest.

10. The method of claim 1, further comprising receiving, by the processor, search parameters specifying retrieval of one or more images associated with a tag indicating that the one or more images includes the event of interest; and in response to receiving the search parameters, initiating, by the processor, display of the one or more images.

11. The method of claim 10, wherein each tag includes data identifying a respective point in time associated with each of the one or more images and wherein initiating display of the one or more images comprises:

initiating display of a timeline associated with the one or more images; and populating the timeline with one or more tags corresponding to the one or more images to indicate relative points in time associated with the one or more images including the event of interest.

12. The method of claim 1, further comprising selecting the plurality of images for analysis based on at least some of the plurality of images corresponding to audio data associated with the event of interest.

13. The method of claim 1, further comprising determining that the plurality of images depicts the motion with respect to the specified person or the specified object.

14. A non-transitory computer-readable medium having instructions stored thereon for processing data information, such that the instructions, when carried out by a processing device, enable the processing device to perform operations of:

receiving an input describing an event of interest, wherein the event of interest comprises at least one quality parameter associated with a specified range of values for the quality parameter and at least one of a specified person or a specified object;

responsive to receiving the input describing the event of interest, analyzing a plurality of images depicting a motion with respect to the specified person or the specified object to determine which of the plurality of images include the event of interest identified by the input, wherein analyzing the plurality of images comprises:

for each of the plurality of images, generating a respective value for the at least one quality parameter based on a comparison of at least one image of the plurality of images with at least another image of the plurality of images, and identifying a subset of images of the plurality of images depicting the motion for which the respective value is within the specified range; and based on analyzing the plurality of images, generating a respective tag for each image of the subset of images including the event of interest.

15. The non-transitory computer-readable medium of claim 14, wherein receiving the input identifying the event of interest comprises the input identifying the event of interest in a first image and wherein analyzing the plurality of images comprises determining that the event of interest is in a second image different from the first image.

16. The non-transitory computer-readable medium of claim 14, wherein the event of interest further comprises one or more physical characteristics of the least one of the specified person or the specified object.

17. The non-transitory computer-readable medium of claim 14, wherein the event of interest further comprises a position in a respective image of the least one of the specified person or the specified object.

18. The non-transitory computer-readable medium of claim 14, further comprising instructions that enable the processing device to perform additional operations comprising:

receiving search parameters specifying retrieval of one or more images associated with a tag indicating that the one or more images includes the event of interest; and in response to receiving the search parameters:

initiating display of a timeline associated with the one or more images;

populating the timeline with one or more tags corresponding to the one or more images to indicate relative points in time associated with the one or more images including the event of interest; and initiating display of the one or more images associated with the timeline.

19. The non-transitory computer-readable medium of claim 18, wherein the event of interest further comprises at least one additional quality parameter different from the at least one quality parameter and wherein analyzing the plurality of images comprises determining which of the plurality of images includes image content having an additional respective value for the at least one additional quality parameter that is within an additional specified range.

20. The non-transitory computer-readable medium of claim 19, wherein the wherein the at least one quality parameter and the at least one additional quality parameter each comprises at least one of panning, zooming, camera tilting, focus, shakiness of camera, brightness, or contrast.

21. The non-transitory computer-readable medium of claim 14, wherein the input comprises audiovisual content and wherein analyzing the plurality of images comprises, for each image of the plurality of images, determining whether image content of the image includes at least part of the audiovisual content.

22. The non-transitory computer-readable medium of claim 14, wherein analyzing the plurality of images comprises, for each image of the plurality of images, analyzing a coloration of pixels in the image.

23. A computer system comprising:

a processor;

a memory unit that stores instructions associated with an application executed by the processor;

a display; and an interconnect coupling the processor, the memory unit, and the display, enabling the computer system to execute the application and perform operations of:

receiving an input describing an event of interest, wherein the event of interest comprises at least one quality parameter associated with a specified range of values for the quality parameter and at least one of a specified person or a specified object;

responsive to receiving the input describing the event of interest, analyzing a plurality of images depicting a motion with respect to the specified person or the specified object to determine which of the plurality of images include the event of interest, wherein analyzing the plurality of images comprises:

for each of the plurality of images, generating a respective value for the at least one quality parameter based on a comparison of at least one image of the plurality of images with at least another image of the plurality of images, and identifying a subset of images of the plurality of images depicting the motion for which the respective value is within the specified range; and based on analyzing the plurality of images, generating a respective tag for each image of the subset of images including the event of interest.

24. The computer system of claim 23, wherein the event of interest further comprises one or more physical characteristics of the least one of the specified person or the specified object.

25. The computer system of claim 24, wherein the event of interest comprises at least one person and the one or more physical characteristics comprises, for the least one person, include one or more of hair color or eye color.

26. The computer system of claim 23, wherein the event of interest comprises a first person or object and a second person or object and wherein generating the respective tag for each image of the subset of images comprises generating a first tag of a first tag type corresponding to the first person or object and generating a second tag of a second tag type corresponding to the second person or object.

27. The computer system of claim 23, wherein the event of interest further comprises a first parameter and a second parameter and wherein analyzing the plurality of images to determine which of the plurality of images include the event of interest comprises determining that a respective image has a first respective value for the first parameter in a first range and a second respective value for the second parameter in a second range.

28. The computer system of claim 23, wherein the event of interest further comprises at least one additional quality parameter different from the at least one quality parameter and wherein analyzing the plurality of images comprises determining which of the plurality of images includes image content having an additional respective value for the at least one additional quality parameter that is within an additional specified range.

* * * * *